(12) United States Patent
Shimizu et al.

(10) Patent No.: US 9,686,529 B2
(45) Date of Patent: Jun. 20, 2017

(54) IMAGE PROCESSING APPARATUS, IMAGE PROCESSING METHOD, AND PROGRAM

(71) Applicant: Saturn Licensing LLC, New York, NY (US)

(72) Inventors: Akira Shimizu, Saitama (JP); Keisuke Watanabe, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 191 days.

(21) Appl. No.: 14/400,384

(22) PCT Filed: Mar. 27, 2013

(86) PCT No.: PCT/JP2013/058975
§ 371 (c)(1),
(2) Date: Nov. 11, 2014

(87) PCT Pub. No.: WO2013/172098
PCT Pub. Date: Nov. 21, 2013

(65) Prior Publication Data
US 2015/0138315 A1    May 21, 2015

(30) Foreign Application Priority Data
May 14, 2012    (JP) ................. 2012-110718

(51) Int. Cl.
*H04N 13/00* (2006.01)
*H04N 21/488* (2011.01)

(52) U.S. Cl.
CPC ....... *H04N 13/0022* (2013.01); *H04N 13/007* (2013.01); *H04N 13/0007* (2013.01); *H04N 21/4884* (2013.01)

(58) Field of Classification Search
CPC .......... H04N 13/0022; H04N 13/0007; H04N 13/007; H04N 21/4884
(Continued)

(56) References Cited

U.S. PATENT DOCUMENTS

2003/0123753 A1    7/2003  Chow
2011/0102543 A1    5/2011  Lu
(Continued)

FOREIGN PATENT DOCUMENTS

CN    102202224    9/2011
JP    3086577    9/2000
(Continued)

OTHER PUBLICATIONS

Japanese Patent Office Action corresponding to Japanese Serial No. 2012-110718 dated Jul. 26, 2016.
(Continued)

*Primary Examiner* — Jeffery Williams
(74) *Attorney, Agent, or Firm* — Dentons US LLP

(57) ABSTRACT

Provided is an image processing apparatus including a subtitle information acquiring unit configured to acquire subtitle information to be combined with a main stereoscopic picture, a parallax acquiring unit configured to acquire a parallax causing the subtitle information to be stereoscopically displayed, a stereoscopic subtitle picture generating unit configured to generate a stereoscopic subtitle picture to be stereoscopically displayed at a display position according to the parallax based on the subtitle information, and an edge processing unit configured to change intensity of an edge in the stereoscopic subtitle picture according to the parallax.

8 Claims, 20 Drawing Sheets

(58) Field of Classification Search
USPC .......................................................... 348/43
See application file for complete search history.

(56) References Cited

U.S. PATENT DOCUMENTS

2011/0316984 A1    12/2011   Akeley et al.
2012/0120200 A1*    5/2012   Newton ............. H04N 13/0003
                                              348/46

FOREIGN PATENT DOCUMENTS

| JP | 2008-033897 | 2/2008 | |
| JP | 2011-249945 | 12/2011 | |
| JP | 2012-4654 | 1/2012 | |
| JP | 2012-049920 | 3/2012 | |
| WO | 2010085074 | 7/2010 | |
| WO | 2010/095074 | 8/2010 | |
| WO | WO 2011028547 A2 * | 3/2011 | ............. H04N 19/00 |

OTHER PUBLICATIONS

Supplementary European Search Report corresponding to European Serial No. 13791643 dated Dec. 3, 2015.

* cited by examiner

FIG. 5
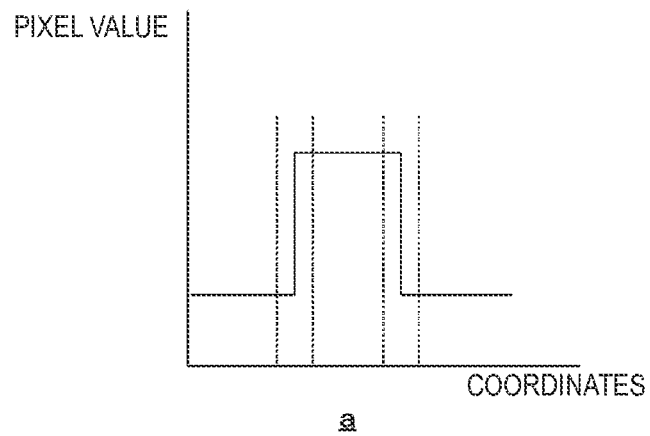
a
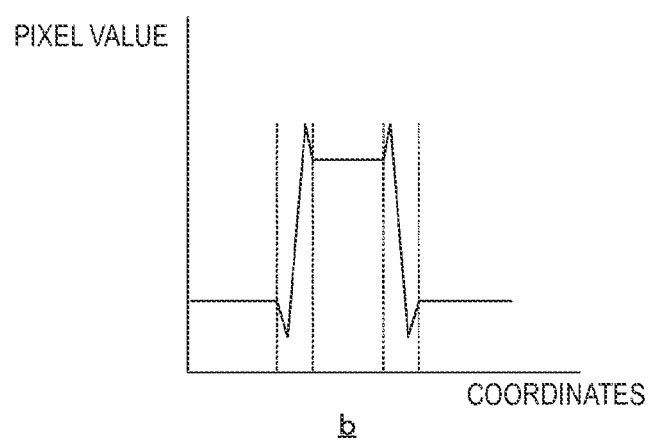
b
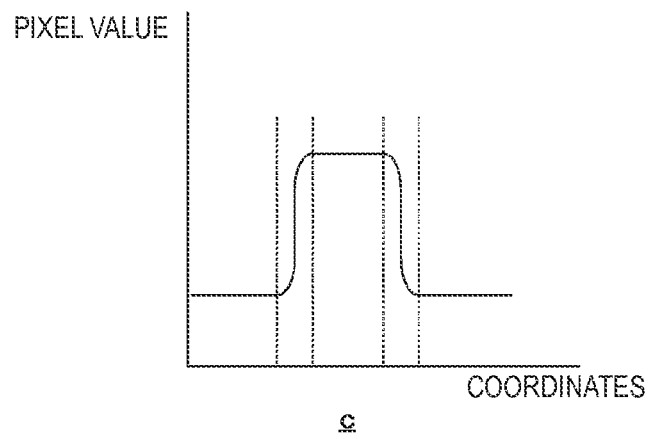
c

FIG. 8

| stream_id | "10111101" IS SET |
|---|---|
| PES_packet_length | VALUE SPECIFYING LENGTH OF PES PACKET IS SET |
| data_alignment_indicator | "1" INDICATING THAT subtitle segments ARE ARRANGED IN PES PACKET IS SET |
| Presentation_Time_Stamp of subtitle | INDICATE DISPLAY START TIME OF PICTURE GROUP TRANSFERRED VIA PES PACKET TOGETHER WITH PTS |
| PES_packet_data_byte | PES_data_field IS STORED |

| Syntax | Size |
|---|---|
| PES_data_field() { | |
|     data_identifier | 8 |
|     subtitle_stream_id | 8 |
|     while nextbits() == '0000 1111' { | |
|         Subtitling_segment() | |
|     } | |
|     end_of_PES_data_field_marker | 8 |
| } | |

| Syntax | Size |
|---|---|
| Subtitling_segment() { | |
|     sync_byte | 8 |
|     segment_type | 8 |
|     page_id | 16 |
|     segment_length | 16 |
|     segment_data_field() | |
| } | |

FIG. 9

| ITEM | DATA |
|---|---|
| Subtitling_segment() { | |
| sync_byte | ... |
| segment_type | 0x13 |
| page_id | ... |
| segment_length | ... |
| segment_data_field() | SUBTITLE DATA |
| } | | a

| ITEM | DATA |
|---|---|
| Subtitling_segment() { | |
| sync_byte | ... |
| segment_type | 0x15 |
| page_id | ... |
| segment_length | ... |
| segment_data_field() | PARALLAX |
| } | | b

| PTS<br>(Presentation Time Stamp) | PARALLAX<br>(-127~128) | SUBTITLE DATA |
|---|---|---|
| PTS #1 | 0 | SUBTITLE DATA #1 |
| PTS #2 | 10 | SUBTITLE DATA #2 |
| PTS #3 | -20 | SUBTITLE DATA #3 |
| ... | ... | ... |

FIG. 13
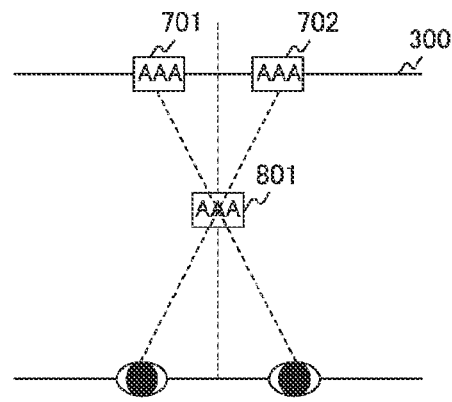
a
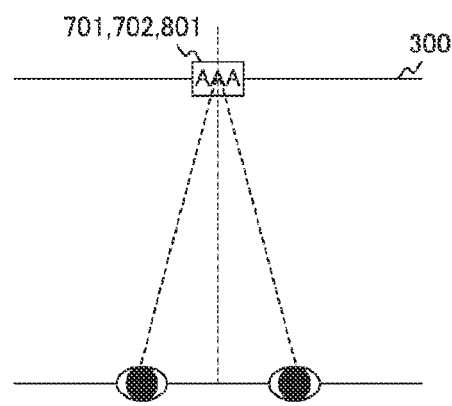
b
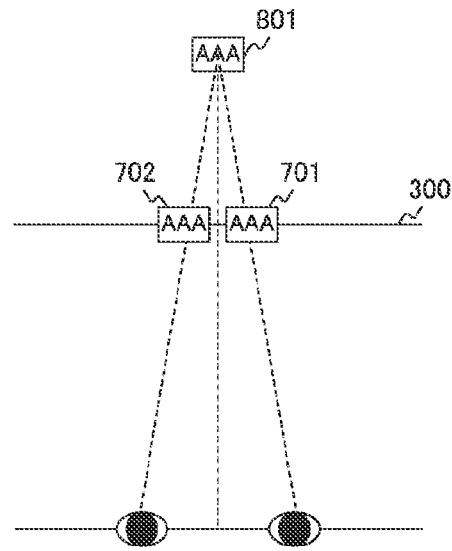
c

FIG. 14
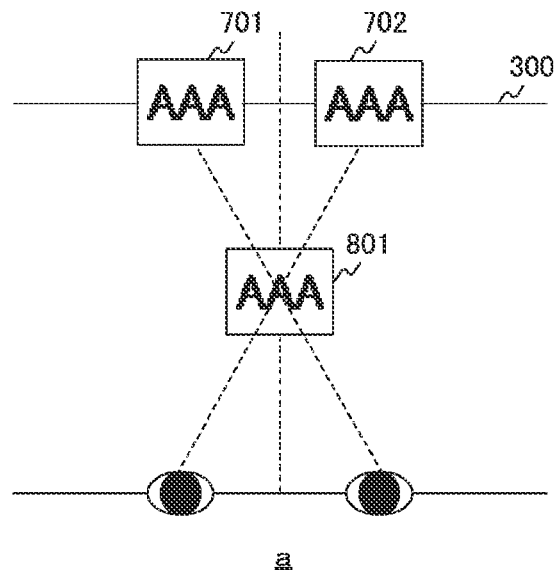
a
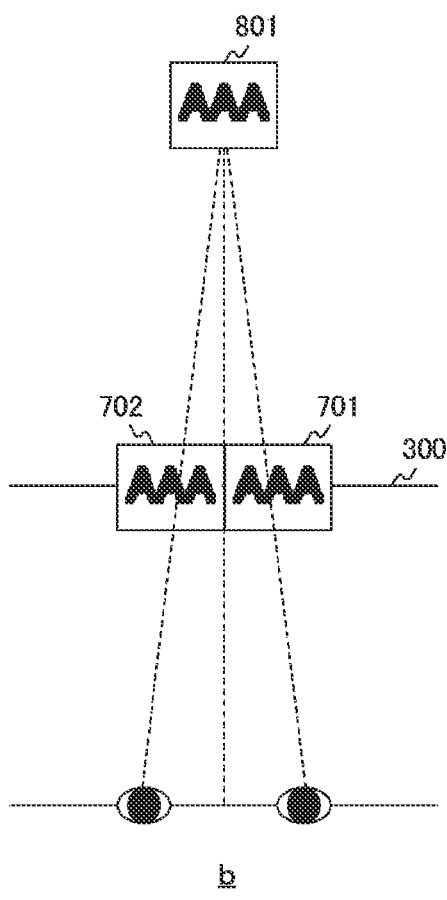
b

FIG. 18
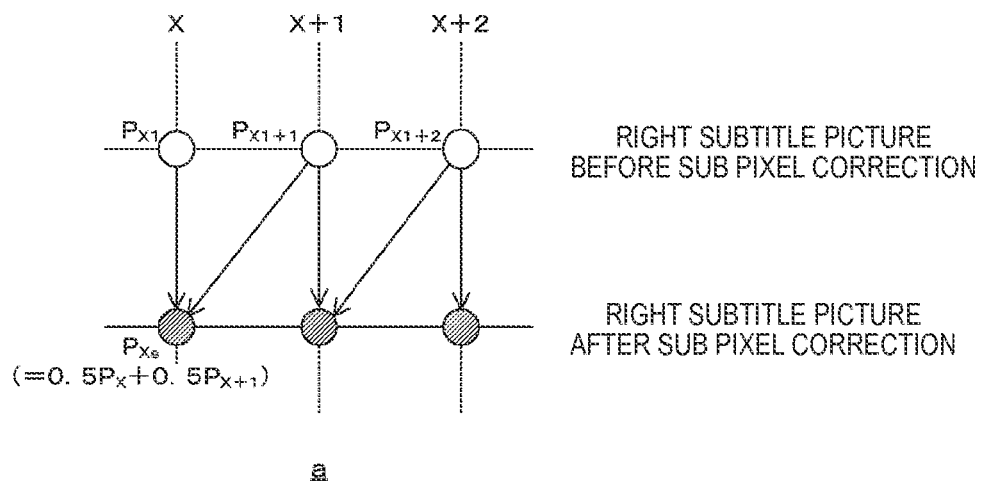
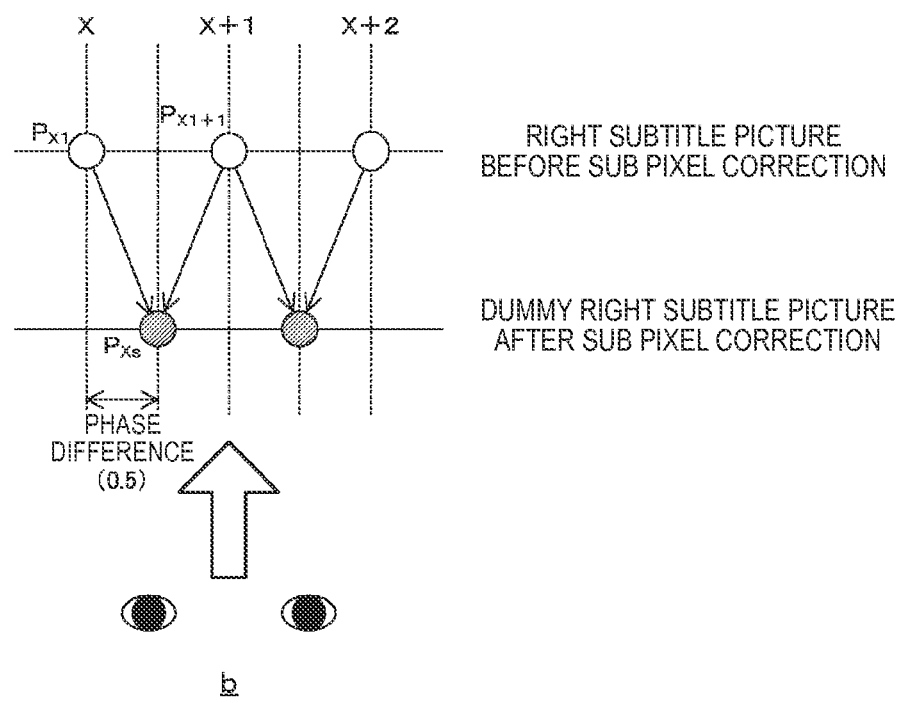

FIG. 19
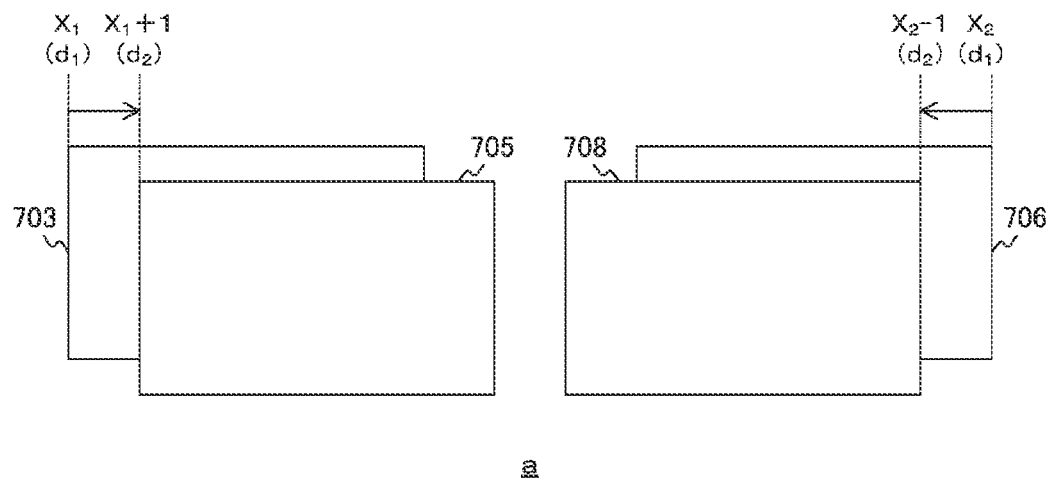
a
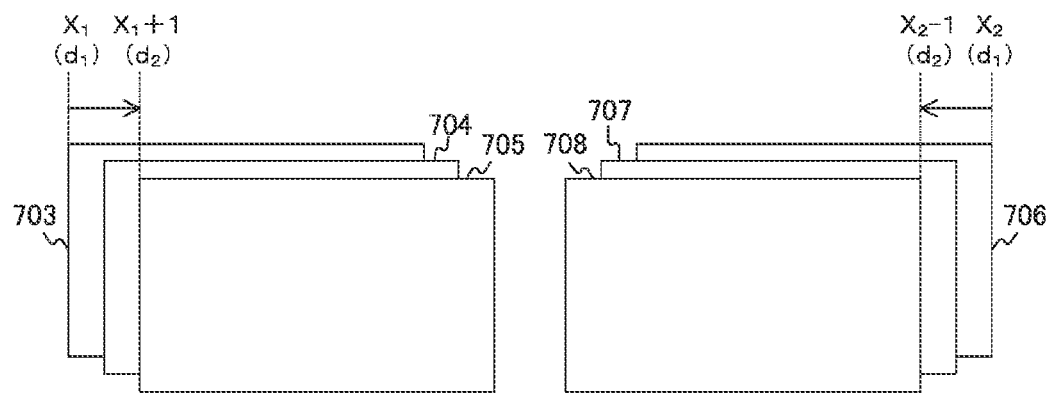
b

IMAGE PROCESSING APPARATUS, IMAGE PROCESSING METHOD, AND PROGRAM

TECHNICAL FIELD

The present technology relates to an image processing apparatus, an image processing method, and a program causing a computer to execute the same method. Particularly, the present technology relates to an image processing apparatus and an image processing method that combine subtitles with a moving picture, and a program causing a computer to execute the same method.

BACKGROUND ART

In the past, display devices that display a moving picture such that the moving picture can be stereoscopically viewed (that is, perform stereoscopic display) have been used. For example, a display device can cause a moving picture to be stereoscopically presented by imaging a left picture and a right picture having a parallax therebetween as pictures configuring the moving picture and displaying the left picture and the right picture such that the left picture is viewed by the left eye, and the right picture is viewed by the right eye. At the time of display, the display device alternately displays the left and right pictures in a time division manner, and an active shutter glasses scheme in which left and right shutters are operated by dedicated glasses in synchronization with a switching timing thereof is used.

In such display devices, a technique of combining closed captions with a moving picture has been proposed (for example, see Patent Literature 1). Closed captions are subtitles generated independently of a moving picture so that a display device can perform control, for example, such that subtitles are displayed or not displayed. On the other hand, subtitles that are supplied in a form combined with a moving picture and hardly controlled to be displayed or not displayed by a display device are referred to as open captions.

When a display device adds closed captions, the closed captions are considered to be stereoscopically displayed as well. Commonly, when subtitles are stereoscopically displayed, a planar subtitle picture indicating subtitles is generated and the subtitle picture is converted into a picture to be stereoscopically displayed using a 2D-to-3D conversion technique. The 2D-to-3D conversion refers to a technique of converting a picture that is not stereoscopically displayed into a picture to be stereoscopically displayed. Specifically, a technique of generating two pictures by causing a normal planar picture to deviate rightward and leftward in a horizontal direction and using one of the two pictures as a left picture to be viewed by the left eye and the other as a right picture to be viewed by the right eye is used (for example, see Patent Literature 2).

CITATION LIST

Patent Literature

Patent Literature 1: JP 2012-4654A
Patent Literature 2: JP 3086577B

SUMMARY OF INVENTION

Technical Problem

However, in the related art, when a subtitle picture is stereoscopically displayed, it is hard to emphasize a sense of perspective. In the 2D-to-3D conversion disclosed in Patent Literature 2, a planar picture is simply shifted, and even when a planar subtitle picture is stereoscopically displayed using this technique, compared to when a moving picture including a stereoscopic object is stereoscopically displayed, a sense of perspective of a subtitle picture is insufficient. Thus, when a subtitle picture is stereoscopically displayed, it is desirable to emphasize a sense of perspective of the subtitle picture. Meanwhile, in the related art, since a process of changing a sense of perspective of a picture is not performed, when this technique is applied to a case of stereoscopically displaying a subtitle picture, there is a problem in that a sense of perspective is insufficient.

The present technology was made in light of the foregoing, and it is an object of the present technology to emphasize a sense of perspective of a subtitle picture.

Solution to Problem

The present technology has been made to solve the above problems, and according to a first aspect thereof, there is provided an image processing apparatus including a subtitle information acquiring unit configured to acquire subtitle information to be combined with a main stereoscopic picture, a parallax acquiring unit configured to acquire a parallax causing the subtitle information to be stereoscopically displayed, a stereoscopic subtitle picture generating unit configured to generate a stereoscopic subtitle picture to be stereoscopically displayed at a display position according to the parallax based on the subtitle information, and an edge processing unit configured to change intensity of an edge in the stereoscopic subtitle picture according to the parallax; an image processing method; and a program for causing a computer to execute the method. Thus, intensity of an edge in a stereoscopic subtitle picture is changed according to a parallax.

According to the first aspect, the edge processing unit may increase the intensity of the edge according to the parallax when the display position is in front of a certain reference position, and decreases the intensity of the edge according to the parallax when the display position is behind the reference position. Thus, the intensity of the edge according to the parallax is increased when the display position is in front of a certain reference position, and the intensity of the edge according to the parallax is decreased when the display position is behind the reference position.

According to the first aspect, a pixel mixing unit configured to mix pixel values of neighboring pixels based on a mixing rate according to a position of a sub pixel to be displayed between the neighboring pixels in the stereoscopic subtitle picture may be further included, and the edge processing unit may change the intensity of the edge according to the position and the parallax. Thus, the intensity of the edge is changed according to the position and the parallax of the sub pixel.

According to the first aspect, the pixel mixing unit may use a position according to the parallax as the position of the sub pixel. Thus, the position according to the parallax is used as the position of the sub pixel.

According to the first aspect, the edge processing unit may include an edge extracting unit configured to extract a region of the edge in the stereoscopic subtitle picture, a correcting unit configured to increase or decrease a pixel value in the extracted region of the edge according to the parallax, and an edge combining unit configured to combine the region of the edge having the increased or decreased pixel value with the stereoscopic subtitle picture and change the intensity of the edge. Thus, an effect of combining the region of the edge having the pixel value increased or decreased according to the parallax with the stereoscopic subtitle picture and changing the intensity of the edge is obtained.

Further, in the first aspect, the edge extracting unit that combines the region of the edge having the increased or decreased pixel value with the stereoscopic subtitle picture and changes the intensity of the edge may extract a region in which a frequency of a pixel value distribution in the stereoscopic subtitle picture is higher than a certain threshold value as the region of the edge. Thus, an effect of extracting a region in which a frequency of a pixel value distribution in the stereoscopic subtitle picture is higher than a certain threshold value as the region of the edge is obtained.

Further, in the first aspect, a subtitle combining unit configured to combine the stereoscopic subtitle picture having the changed intensity of the edge with the main stereoscopic picture may be further provided. Thus, an effect of combining the stereoscopic subtitle picture having the changed intensity of the edge with the main stereoscopic picture is obtained.

Advantageous Effects of Invention

According to the present technology, an excellent effect of emphasizing a sense of perspective of a subtitle picture is obtained.

BRIEF DESCRIPTION OF DRAWINGS

FIG. 5 is a diagram illustrating exemplary pixel value distributions before and after edge processing according to the first embodiment.

FIG. 8 is a diagram illustrating an exemplary data structure of a PES packet of a subtitle stream according to the first embodiment.

FIG. 9 is a diagram illustrating exemplary data stored in a PES packet of a subtitle stream according to the first embodiment.

FIG. 10 is a diagram illustrating an exemplary configuration of a subtitle data buffer according to the first embodiment.

FIG. 13 is a diagram illustrating an exemplary stereoscopic display method according to the first embodiment.

FIG. 14 is a diagram illustrating an exemplary stereoscopic subtitle picture in which a sense of perspective is emphasized according to the first embodiment.

FIG. 18 is a diagram for describing a sub pixel correction method according to the second embodiment.

FIG. 19 is a diagram illustrating exemplary left subtitle pictures and right subtitle pictures before and after sub pixel correction according to the second embodiment.

DESCRIPTION OF EMBODIMENTS

Hereinafter, modes (hereinafter referred to as "embodiments") for carrying out the present technology will be described. The description will proceed in the following order.

1. First embodiment (example of changing edge intensity according to parallax)
2. Second embodiment (example of changing edge intensity based on mixing rate and parallax)

1. First Embodiment

Exemplary Configuration of Information Processing System

Figure 1:
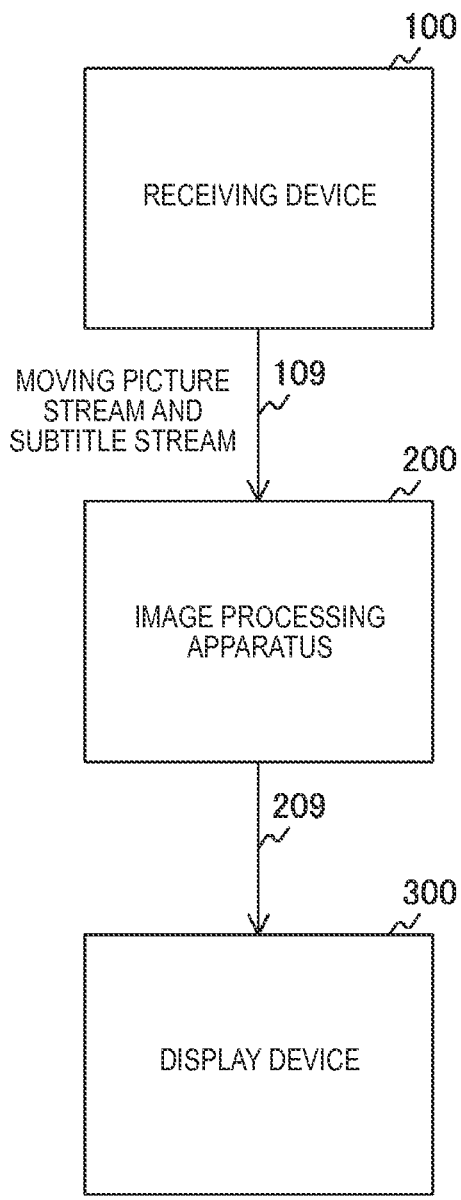
FIG. 1 is an overall diagram illustrating an exemplary information processing system according to a first embodiment.

FIG. 1 is an overall diagram illustrating an example of an information processing system according to an embodiment. The information processing system includes a receiving device 100, an image processing apparatus 200, and a display device 300.

The receiving device 100 receives a moving picture stream and a subtitle stream. The moving picture stream is data of a moving picture delivered from a broadcasting station or the like in conformity with a certain broadcasting standard. As a broadcasting standard, for example, a digital video broadcast (DVB) is used. The moving picture includes a plurality of pictures that are chronologically displayed. Further, the moving picture is a moving picture created to be stereoscopically displayed, and each of the pictures in the moving picture is referred to as a "main stereoscopic picture." Each of the main stereoscopic pictures includes a left main picture viewed by the viewer's left eye and a right main picture viewed by the right eye.

The moving picture is coded according to a certain coding scheme as necessary. As a coding scheme, for example, a Moving Picture Experts Group (MPEG) 2-transport stream (TS) standard is used. In the MPEG2-TS, a coded picture is stored in a packetized elementary stream (PES) packet, and each picture is associated with a presentation time stamp (PTS). The PTS is reproduction output time management information, and indicates when a picture given a time stamp is reproduced and output.

Further, the receiving device 100 may receive analog broadcasting and perform analog to digital (A/D) conversion on a broadcast wave to generate a moving picture stream.

The subtitle stream received by the receiving device 100 is data related to subtitles delivered from a broadcasting station or the like. Specifically, the subtitle stream includes subtitle data and a parallax. The subtitle data includes, for example, a picture (hereinafter referred to as a "subtitle picture") indicating subtitles and a character string indicating subtitles. The parallax functions to cause subtitles to be stereoscopically displayed. Specifically, when a left subtitle picture and a right subtitle picture are generated from subtitle data, deviation between pictures in the horizontal direction corresponds to a parallax. A picture including a left subtitle picture and a right subtitle picture is hereinafter referred to as a "stereoscopic subtitle picture." The subtitle data and the parallax are coded and stored in a PES packet as necessary, and each of the subtitle data the parallax is provided with the PTS. The PTS is time management information indicating when the subtitles are reproduced and output, and is used to reproduce the subtitles in synchronization with the moving picture.

The subtitle stream is multiplexed into the moving picture stream and delivered. The receiving device 100 demultiplexes the subtitle stream from the moving picture stream, and supplies the demultiplexed moving picture stream and the subtitle stream to the image processing apparatus 200. Instead of the receiving device 100, the image processing apparatus 200 may demultiplex the subtitle stream.

The image processing apparatus 200 combines subtitles with a moving picture based on the moving picture stream and the subtitle stream. Specifically, the image processing apparatus 200 acquires a parallax and subtitle data from the subtitle stream, and generates a stereoscopic subtitle picture to be stereoscopically displayed at a position according to the parallax based on the subtitle data. The image processing apparatus 200 combines the stereoscopic subtitle picture with the moving picture. Then, the image processing apparatus 200 supplies the moving picture combined with the stereoscopic subtitle picture to the display device 300.

The image processing apparatus 200 is configured to acquire a moving picture stream and a subtitle stream delivered from a broadcasting station or the like from the receiving device 100, but the image processing apparatus 200 may acquire a moving picture stream and a subtitle stream recorded in a moving picture recording device.

The display device 300 stereoscopically displays the moving picture combined with the stereoscopic subtitle picture. As a stereoscopic display scheme, an active shutter glasses scheme, a polarization display scheme, a parallax barrier scheme, or the like is used.

Example Configuration of Image Processing Apparatus

Figure 2:
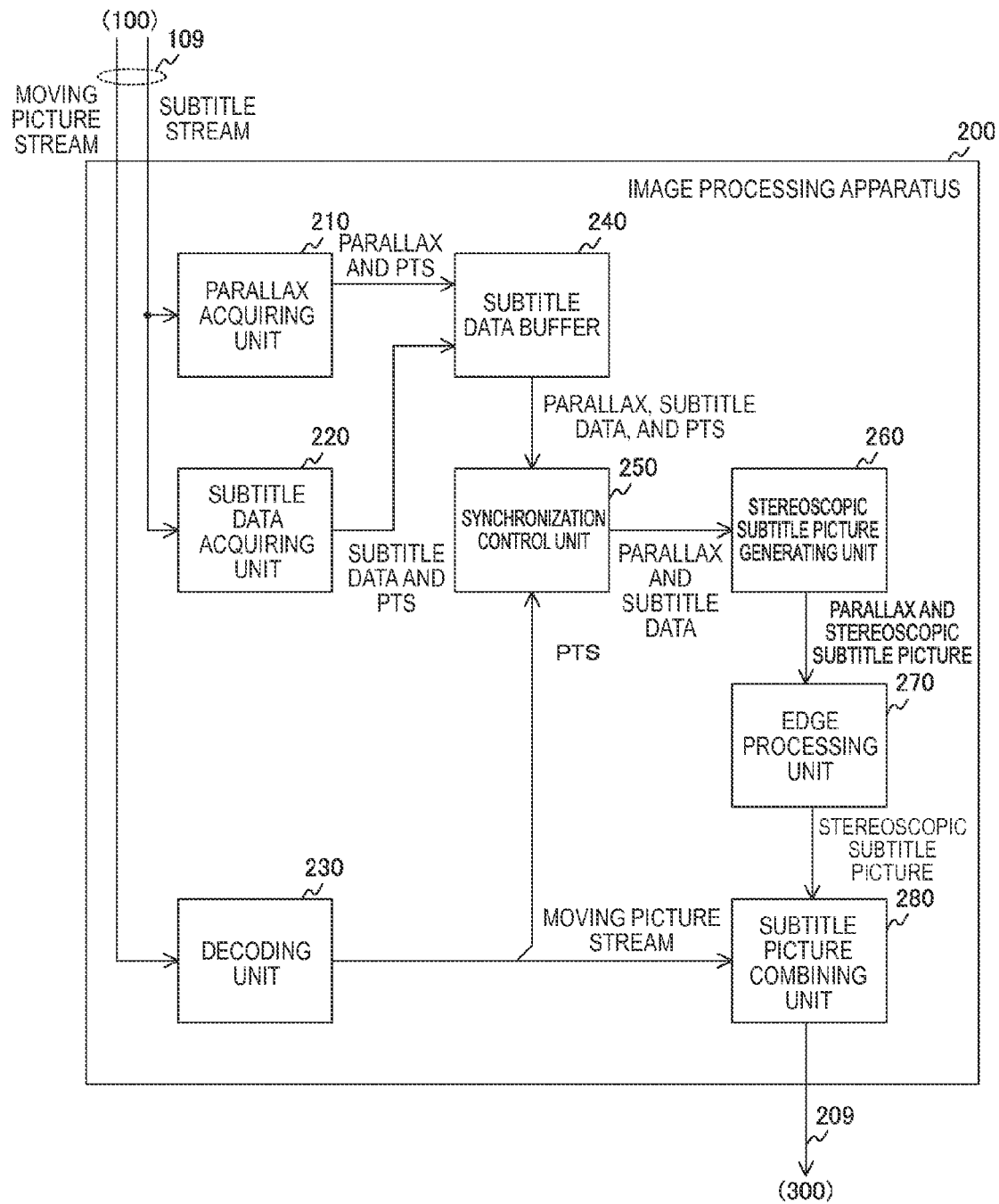
FIG. 2 is a block diagram illustrating an exemplary configuration of an image processing apparatus according to the first embodiment.

FIG. 2 is a block diagram illustrating an exemplary configuration of the image processing apparatus 200. The image processing apparatus 200 includes a parallax acquiring unit 210, a subtitle data acquiring unit 220, a decoding unit 230, a subtitle data buffer 240, a synchronization control unit 250, a stereoscopic subtitle picture generating unit 260, an enlarging/reducing unit 270, and a subtitle picture combining unit 280.

The parallax acquiring unit 210 acquires a parallax and a PTS from the subtitle stream. Specifically, the parallax acquiring unit 210 acquires the PTS from the header of the PES packet in the subtitle stream, and acquires the parallax from the payload of the PES packet. The parallax acquiring unit 210 causes the PTS and the parallax acquired from the same PES packet to be held in the subtitle data buffer 240 in association with each other.

The subtitle data acquiring unit 220 acquires subtitle data and a PTS from the subtitle stream. Specifically, the subtitle data acquiring unit 220 acquires the PTS from the header of the PES packet in the subtitle stream, and acquires the subtitle data from the payload of the PES packet. The parallax acquiring unit 210 causes the PTS and the subtitle data acquired from the same PES packet to be held in the subtitle data buffer 240 in association with each other. The subtitle data acquiring unit 220 is an example of a subtitle information acquiring unit set forth in the appended claims.

When a moving picture stream is coded, the decoding unit 230 decodes the moving picture stream. The decoding unit 230 decodes the moving picture stream according to a decoding scheme corresponding to a coding scheme for the moving picture stream. The decoding unit 230 supplies the decoded moving picture stream to the subtitle picture combining unit 280. Further, the decoding unit 230 acquires the PTS from the subtitle stream, and supplies the PTS to the synchronization control unit 250.

The synchronization control unit 250 supplies the subtitle data and the parallax to the stereoscopic subtitle picture generating unit 260 in synchronization with a display timing of the moving picture. Specifically, the synchronization control unit 250 receives the PTS acquired by the decoding unit 230, and determines whether or not a PTS having a value identical to that of the received PTS is held in the subtitle data buffer 240. When a PTS having a value identical to that of the received PTS is held, the synchronization control unit 250 reads the subtitle data and the parallax corresponding to the PTS from the subtitle data buffer 240. The synchronization control unit 250 supplies the read subtitle data and the parallax to the stereoscopic subtitle picture generating unit 260.

The stereoscopic subtitle picture generating unit 260 generates the stereoscopic subtitle picture (the left subtitle picture and the right subtitle picture) to be stereoscopically displayed at the display position according to the parallax based on the subtitle data. Specifically, when the subtitle data includes the subtitle picture, the stereoscopic subtitle picture generating unit 260 generates a picture deviated from the subtitle picture in the screen in the left direction when viewed by the viewer and a picture deviated from the subtitle picture in the right direction according to the subtitle parallax. The stereoscopic subtitle picture generating unit 260 regards one of the pictures as a left subtitle picture and the other as a right subtitle picture. When the subtitle data includes a character string indicating subtitles, the stereoscopic subtitle picture generating unit 260 generates a picture obtained by rendering the character string as a subtitle picture, and generates the right subtitle picture and the left subtitle picture by causing the subtitle picture to deviate rightward and leftward. The stereoscopic subtitle picture generating unit 260 supplies the generated stereoscopic subtitle picture to the enlarging/reducing unit 270 together with the parallax.

The edge processing unit 270 changes the edge intensity in the stereoscopic subtitle picture according to a parallax. Here, the edge intensity indicates a degree of a steep change in a pixel value around an edge. When the degree of the change is large (that is, the edge intensity is strong), the edge appears clear. However, when the degree of the change is small (that is, the edge intensity is weak), the edge appears blurry.

When the display position at which the stereoscopic subtitle picture is displayed is in front of the reference position, the edge processing unit 270 increases the edge intensity according to a parallax, and emphasizes the edge. However, when the display position of the stereoscopic subtitle picture is behind the reference position, the edge processing unit 270 decreases the edge intensity according to a parallax, and blurs the edge. Using an optical illusion according to such processing, it is possible to emphasize a sense of perspective. For example, the reference position is set to the position on the display plane of the display device 300. The edge processing unit 270 supplies the stereoscopic subtitle picture having the changed edge intensity to the subtitle picture combining unit 280.

The subtitle picture combining unit 280 combines the stereoscopic subtitle picture having the changed edge intensity with the moving picture. The subtitle picture combining unit 280 supplies the moving picture stream combined with the stereoscopic subtitle picture to the display device 300.

Exemplary Configuration of Edge Processing Unit

Figure 3:
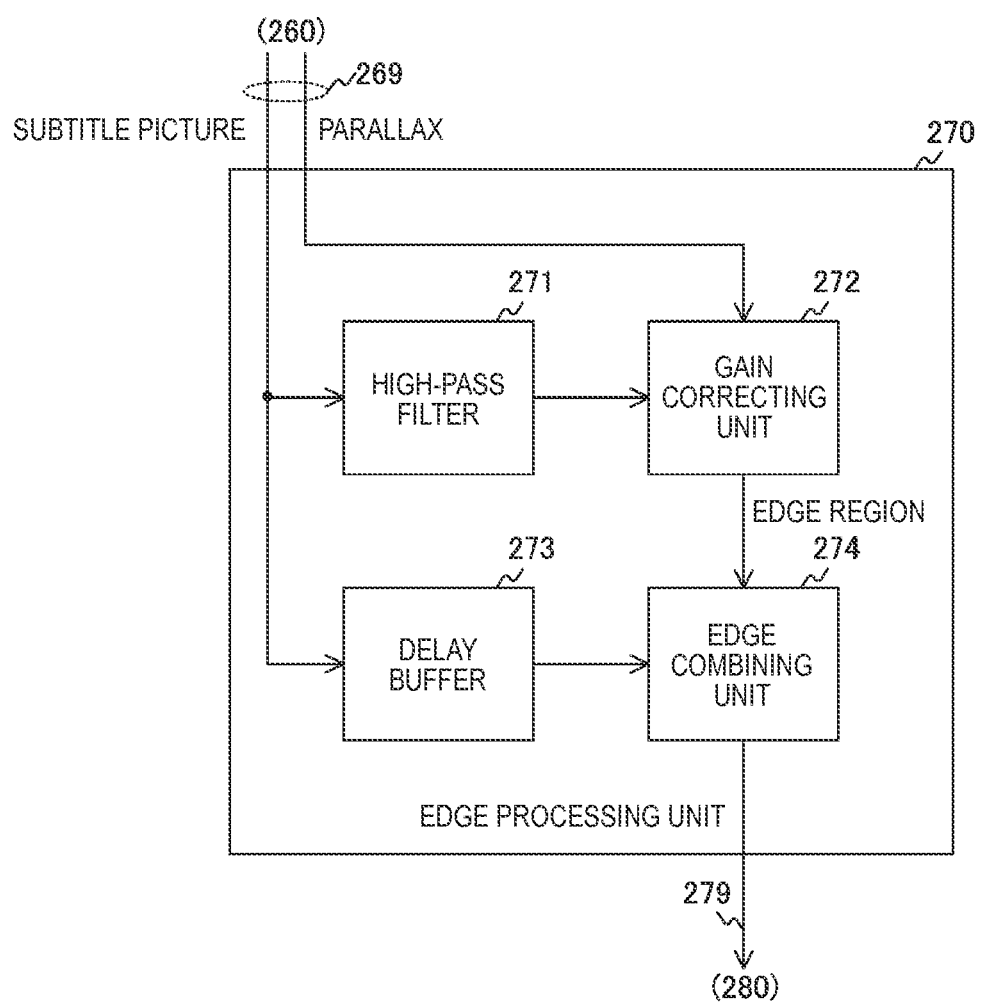
FIG. 3 is a block diagram illustrating an exemplary configuration of an edge processing unit according to the first embodiment.

FIG. 3 is a block diagram illustrating an exemplary configuration of the edge processing unit 270 according to the first embodiment. The edge processing unit 270 includes a high-pass filter 271, a gain correcting unit 272, a delay buffer 273, and an edge combining unit 274.

The high-pass filter 271 extracts a region in which a frequency of the distribution of pixel values (for example, brightness values) in the stereoscopic subtitle picture is higher than a certain threshold value as an edge region. The high-pass filter 271 supplies the extracted region to the gain correcting unit 272 as the edge region. The high-pass filter 271 is an example of an edge extracting unit set forth in the appended claims.

The gain correcting unit 272 corrects a pixel value of the edge region according to a parallax. Specifically, the gain correcting unit 272 obtains a gain G for increasing or decreasing a pixel value according to the following Formula 1. A unit of a gain is, for example, decibels (dB).

$$G=(-\alpha) \times D/Dm \quad \text{Formula 1}$$

In Formula 1, α indicates a correction coefficient for correcting a gain, and is set as a real number. When the gain G decided based on only the parallax D acquired in the parallax acquiring unit 210 is used, insufficiency of a sense of perspective is not resolved, or conversely, a sense of perspective is emphasized too much, and thus in this case, the gain is corrected using the correction coefficient α. Specifically, when the user determines that a sense of perspective is insufficient, a large correction coefficient α is set by the user, and when the user determines that a sense of perspective is emphasized too much, a small correction coefficient is set by the user. D is a parallax defined based on Dm, and Dm indicates a number of steps into which a parallax of each range of the front side or the back side is divided. When the parallax D of each range is divided into 128 steps, "128" is used as the number Dm of steps, and a value of "−128" to "127" is acquired as the parallax D by the image processing apparatus 200. The acquired parallax D is used as an amount for causing the left subtitle picture and the right subtitle picture to deviate from the right subtitle picture in the horizontal direction. When the parallax D is negative, the subtitle picture is stereoscopically displayed in front of the reference position in the depth direction, whereas when the parallax D is positive, the subtitle picture is stereoscopically displayed behind the reference position. When the parallax D is "0," the subtitle picture is displayed at the reference position but not stereoscopically viewed.

The edge processing unit 270 increases or decreases the pixel value of the edge region, for example, according to the following Formula 2, and supplies the edge region to the edge combining unit 274.

$$G=20 \times \log(P_{out}/P_{in}) \quad \text{Formula 2}$$

In Formula 2, $P_{in}$ indicates a pixel value that is not increased or decreased, and/$P_{out}$ indicates an increased or decreased pixel value. Through Formulas 1 and 2, when the parallax D is negative (that is, the display position is the front side), the gain G is calculated to be greater than "0," and the pixel value of the edge region is increased. However, when the parallax D is positive (that is, the display position is the back side), the gain G is calculated to be smaller than "0," and the pixel value of the edge region is decreased. The gain correcting unit 272 is an example of a correcting unit set forth in the appended claims.

The delay buffer 273 delays the stereoscopic subtitle picture input from the stereoscopic subtitle picture generating unit 260, and then supplies the stereoscopic subtitle picture to the edge combining unit 274. The delay time is set to, for example, a time greater than or equal to a time taken to perform processing in the high-pass filter 271 and the gain correcting unit 272.

The edge combining unit 274 combines the edge region with the stereoscopic subtitle picture. The edge intensity is changed by combining the edge region having the changed pixel value. Specifically, when the edge region having the increased pixel value is combined, the edge intensity is increased, and the edge is emphasized. However, when the edge region having the decreased pixel value is combined, the edge intensity is decreased, and the edge is blurred. The edge combining unit 274 supplies the stereoscopic subtitle picture combined with the edge region to the subtitle picture combining unit 280.

The edge processing unit 270 extracts the edge through the high-pass filter 271, but the edge may be extracted using any other method. For example, primary differentiation may be performed on a picture to calculate a gradient, a direction of an edge may be predicted based on a direction of the gradient, and a portion in which the gradient in that direction is locally maximum may be extracted as an edge.

Further, the edge processing unit 270 blurs the edge by correcting the gain, but the edge may be blurred using any other method. For example, an edge may be blurred using a mean filter that replaces a mean value of pixel values around a pixel of interest with a pixel value of the pixel of interest.

Further, in the edge processing unit 270, the parallax D is defined based on the right subtitle picture, but, in contrast, deviation of the left subtitle picture and the right subtitle picture in the horizontal direction based on the left subtitle picture may be used as the parallax D. In this case, when the display position is the front side, the parallax D is positive, and when the display position is the back side, the parallax D is negative. To this end, G is calculated using the following Formula 3.

$$G=\alpha \times D/Dm \quad \text{Formula 3}$$

Through Formula 3, when the parallax D is positive, the gain G is calculated to be greater than "0," and when the parallax D is negative, the gain G is calculated to be less than "0."

Figure 4:
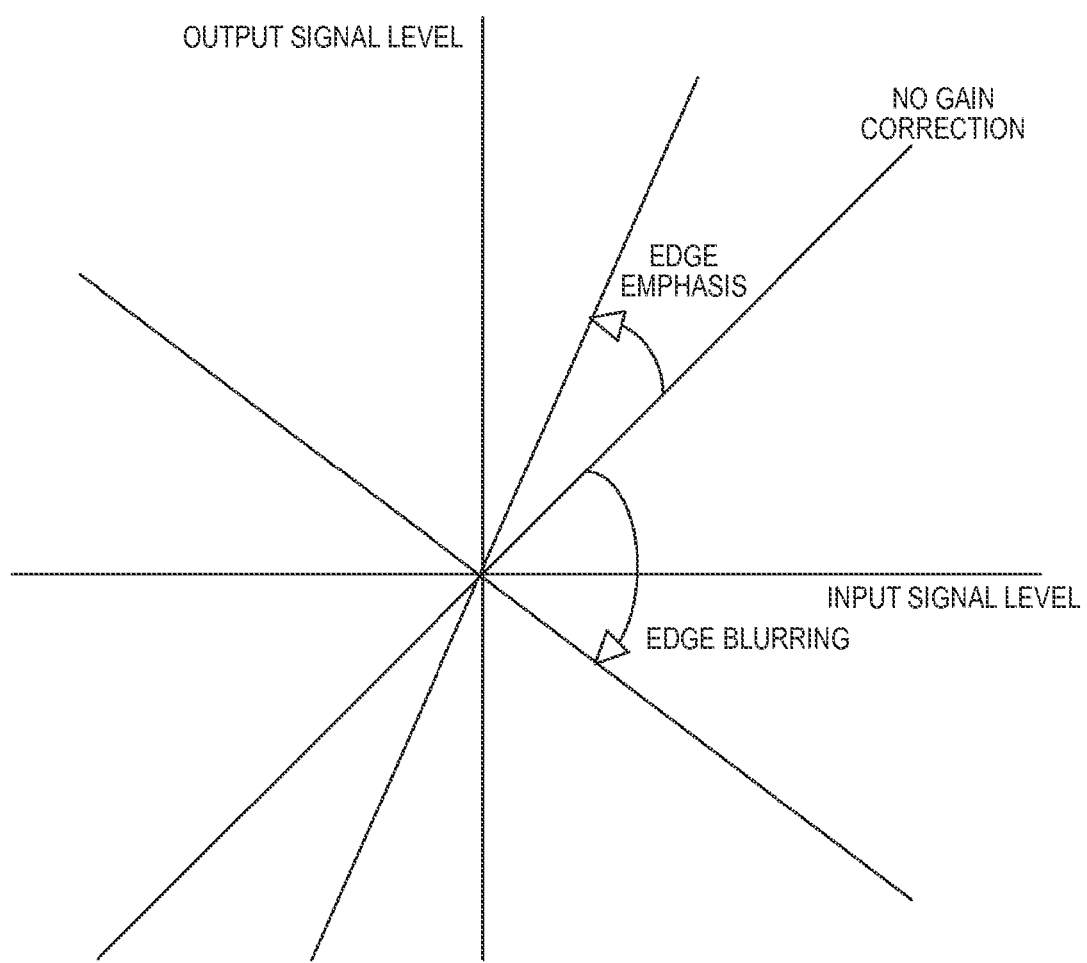
FIG. 4 is a diagram illustrating exemplary gain correction according to the first embodiment.

FIG. 4 is a diagram illustrating exemplary gain correction according to the first embodiment. In FIG. 4, a vertical axis indicates a signal level (that is, a pixel value) input to the gain correcting unit 272, and a horizontal axis indicates a signal level (a pixel value) output after gain correction is performed. As illustrated in FIG. 4, when the gain is greater than "0," the signal level is amplified, and an output signal level is higher than an input signal level. Through this edge region combination, the edge is emphasized. Meanwhile, when the gain is less than "0," the signal level is attenuated, and an output signal level is smaller than an input signal level. Through this edge region combination, the edge is blurred.

FIG. 5 is a diagram illustrating exemplary pixel value distribution before and after edge processing according to the first embodiment. In FIG. 5, a vertical axis indicates a pixel value of a pixel, and a horizontal axis indicates coordinates of a pixel. a in FIG. 5 illustrates exemplary pixel value distribution before edge processing. For example, a region indicated by a dotted line in a in FIG. 5 is large in a change in a pixel value and thus extracted as an edge region through the high-pass filter 271.

b in FIG. 5 illustrates exemplary pixel value distribution when the edge intensity is increased. When the edge processing unit 270 increases a pixel value of an edge region illustrated in a in FIG. 5 and combines the edge region with a stereoscopic subtitle picture of an extraction source, a change in the pixel value of the edge region is large, and the edge is emphasized as illustrated in b in FIG. 5.

c in FIG. 5 illustrates exemplary pixel value distribution when the edge intensity is decreased. When the edge processing unit 270 decreases a pixel value of an edge region illustrated in a in FIG. 5 and combines the edge region with a stereoscopic subtitle picture of an extraction source, a change in the pixel value of the edge region is small, and the edge is blurred as illustrated in b in FIG. 5.

Figure 6:
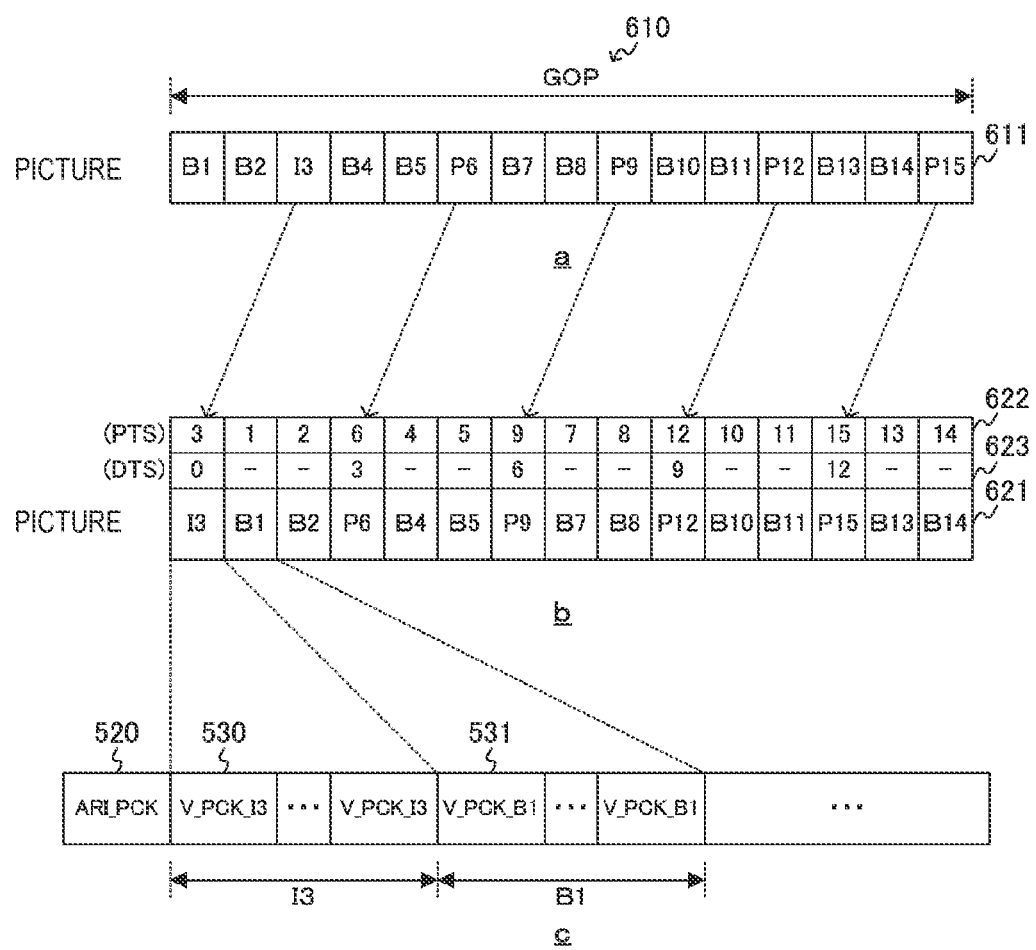
FIG. 6 is a diagram for describing an exemplary configuration of a moving picture stream according to the first embodiment.

FIG. 6 is a diagram illustrating an exemplary configuration of the moving picture stream according to the first embodiment. The moving picture stream is coded in units called groups of pictures (GOPs), and decoded in the decoding unit 230 in units of GOPs. A GOP is a set of pictures including at least one intra (I) picture used as a reference in coding. a in this figure illustrates an example in which a GOP 610 is configured with a total of 15 pictures 611 including one I picture, 4 predirective (P) pictures, and 10 bidirectionally predictive (B) pictures. Here, an I picture is a picture used as a reference in coding. A P picture is a picture to be coded using a difference with an I picture or a P picture that precedes it chronologically. A B picture is a picture to be coded using a difference with I pictures or P pictures chronologically before and after it.

The 15 pictures in the GOP are coded such that some pictures are switched in an order as illustrated in b in FIG. 6. This is done based on a feature of a coding scheme in an MPEG standard to avoid waiting for a chronologically subsequent picture at the time of decoding. For example, in order to decode a B picture (B5), it is necessary to refer to an I picture (I3) and a P picture (P6). To this end, switching has to be performed as illustrated in b in the same figure so that picture data (I3 and P6) is completed when the B picture (B5) is decoded. Further, in order to define an order relation of a picture 521, a pack header of V_PCK is given time stamps such as a PTS 622 and a decoding time stamp (DTS) 623. As described above, the PTS 622 is reproduction and output time management information, and indicates when a unit picture given a time stamp is reproduced and output. Meanwhile, the DTS 623 is decoding time management information, and indicates when a unit picture given a time stamp is decoded.

Coded pictures are placed in one or more packs as illustrated in a in FIG. 6. In a pack, a plurality of PES packets are connected, and a pack header is added. For example, the I picture (I3) is held as V_PCK_I3 (530), and the B picture (B1) is held as V_PCK_B1 (531). In a set of V PCKs 530 configuring one GOP 610, ARI_PCK 520 including supplementary data is multiplexed together with A_PCK 520. A group of multiplexed packs configures a moving picture stream.

Figure 7:
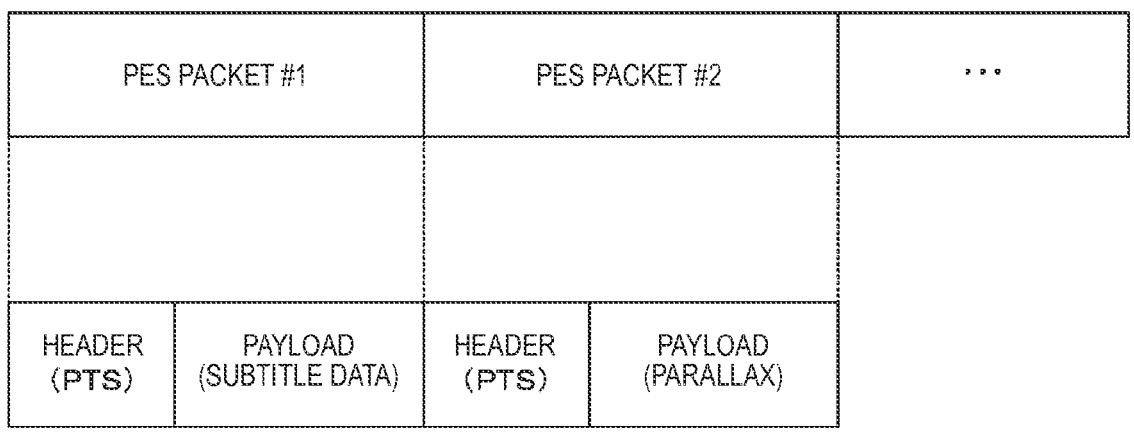
FIG. 7 is a diagram illustrating an exemplary configuration of a subtitle stream according to the first embodiment.

FIG. 7 is a diagram illustrating an exemplary configuration of a subtitle stream according to an embodiment. A subtitle stream is configured with a group of PES packets independent of a moving picture stream. A PES packet is generated by dividing data (for example, subtitle data or a parallax) configuring a subtitle stream as necessary, adding a header, and packetizing resultant data. Each of PES packets in a subtitle stream includes a packet header and a payload. For example, a PTS is described in the packet header. Subtitle data to be displayed at a timing indicated by the PTS and a parallax of the subtitle data are stored in the payload. Further, a horizontal coordinate and a vertical coordinate of a region on which the subtitle data is displayed and a configuration (for example, a range of the horizontal coordinate and the vertical coordinate) of a main picture combined with the subtitle data are stored in the payload.

FIG. 8 is a diagram illustrating an exemplary data structure of a PES packet in a subtitle stream according to an embodiment. For example, data according to the DVB standard is described in a PES packet. In the DVB standard, identification information (Stream_id) of a subtitle stream, a PES packet length (PES_packet_length), and a PTS of subtitle data, and the like are described in a header of a PES packet. Further, an indicator (PES_alignment_indicator) indicating that subtitle data is arranged in a PES packet is described. A payload (data in "PES_data_field") of a PES packet is stored in a field of "PES_packet_data_byte." A payload is provided with a field of "subtitle_segment ( )" In the DVB standard, each piece of data of components of a subtitle stream is referred to as a "segment." The details of each "segment" are described in a field of "subtitle_segment ( )" in FIG. 8. Specifically, information (sync_byte) specifying a start position of "segment" is described in "subtitle_segment ( )". Further, in this field, a (segment_type) and a length (segment_length) of "segment" type and identification information (page_id) of a main picture used by "segment" are described. Further, data of "segment" is stored in "segment_data_field." A type (segment_type) of "segment" is, for example, subtitle data, a parallax, configuration information (for example, a horizontal coordinate and a vertical coordinate of a display region) of subtitle data, or a configuration (for example, a range of a horizontal coordinate and a vertical coordinate) of a main picture combined with subtitle data.

FIG. 9 is a diagram illustrating exemplary data stored in a PES packet according to an embodiment. As described above, "subtitle_segment ( )" in a payload of a PES packet includes a region called "segment_type" or "segment_data_field ( )." Subtitle data or a parallax is stored in "segment_data_field ( )". As a in the same figure illustrates, in a case where the subtitle data is stored in "segment_data_field ( )" as "segment", "0x13" indicating that "segment" is subtitle data is stored in the field of "segment_type." Further, as a in the same figure illustrates, in case a parallax is stored in "segment_data_field ( )" as "segment", "0x15" indicating that "segment" is a subtitle parallax is stored in the field of "segment_type."

FIG. 10 is a diagram illustrating an exemplary configuration of the subtitle data buffer 240. The subtitle data buffer 240 holds the parallax and the subtitle data in association with the PTS. A parallax acquired from a PES packet provided with a PTS is held in the subtitle data buffer 240 in association with the PTS. Further, subtitle data acquired from a PES packet provided with a PTS is held in the subtitle data buffer 240 in association with the PTS. The subtitle data and the parallax that are common in a PTS are held in association with the PTS. For example, when "subtitle data #1" and a parallax of "10" are held in association with a "PTS#1," the "subtitle data #1" and "10" are read at a timing of the "PTS#1." Then, the "subtitle data #1" is stereoscopically displayed at the position according to the parallax "10."

Exemplary Operation of Image Processing Apparatus

Figure 11:
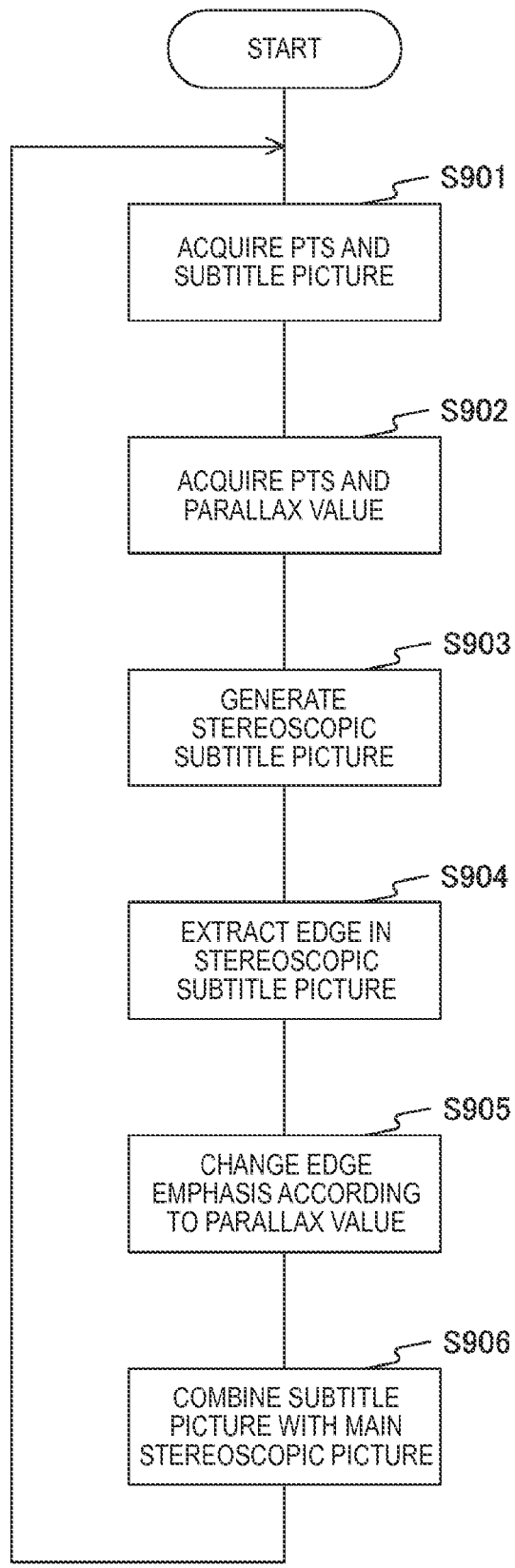
FIG. 11 is a diagram illustrating an exemplary operation of an image processing apparatus according to the first embodiment.

FIG. 11 is a diagram illustrating an exemplary operation of the image processing apparatus 200 according to an embodiment. For example, this operation starts when a moving picture stream and a subtitle stream are input to the image processing apparatus 200.

In the image processing apparatus 200, the parallax acquiring unit 210 acquires a PTS and parallaxes from the subtitle stream, and causes the PTS and the parallaxes to be held in the subtitle data buffer 240 (step S901). Further, the subtitle data acquiring unit 220 acquires the subtitle data and the parallax from the subtitle stream, and causes the subtitle data and the parallax to be held in the subtitle data buffer 240 (step S902). The synchronization control unit 250 reads the subtitle data and the parallax corresponding to the PTS acquired from the moving picture stream from the subtitle data buffer 240. Then, the stereoscopic subtitle picture generating unit 260 generates the stereoscopic subtitle picture from the read subtitle data (step S903).

The edge processing unit 270 extracts an edge in the stereoscopic subtitle picture (step S904), and changes the edge intensity according to the acquired parallax (step S905). The subtitle picture combining unit combines the stereoscopic subtitle picture having the changed edge intensity with the main stereoscopic picture (step S906). After step S906, the image processing apparatus 200 causes the process to return to step S901.

Figure 12:
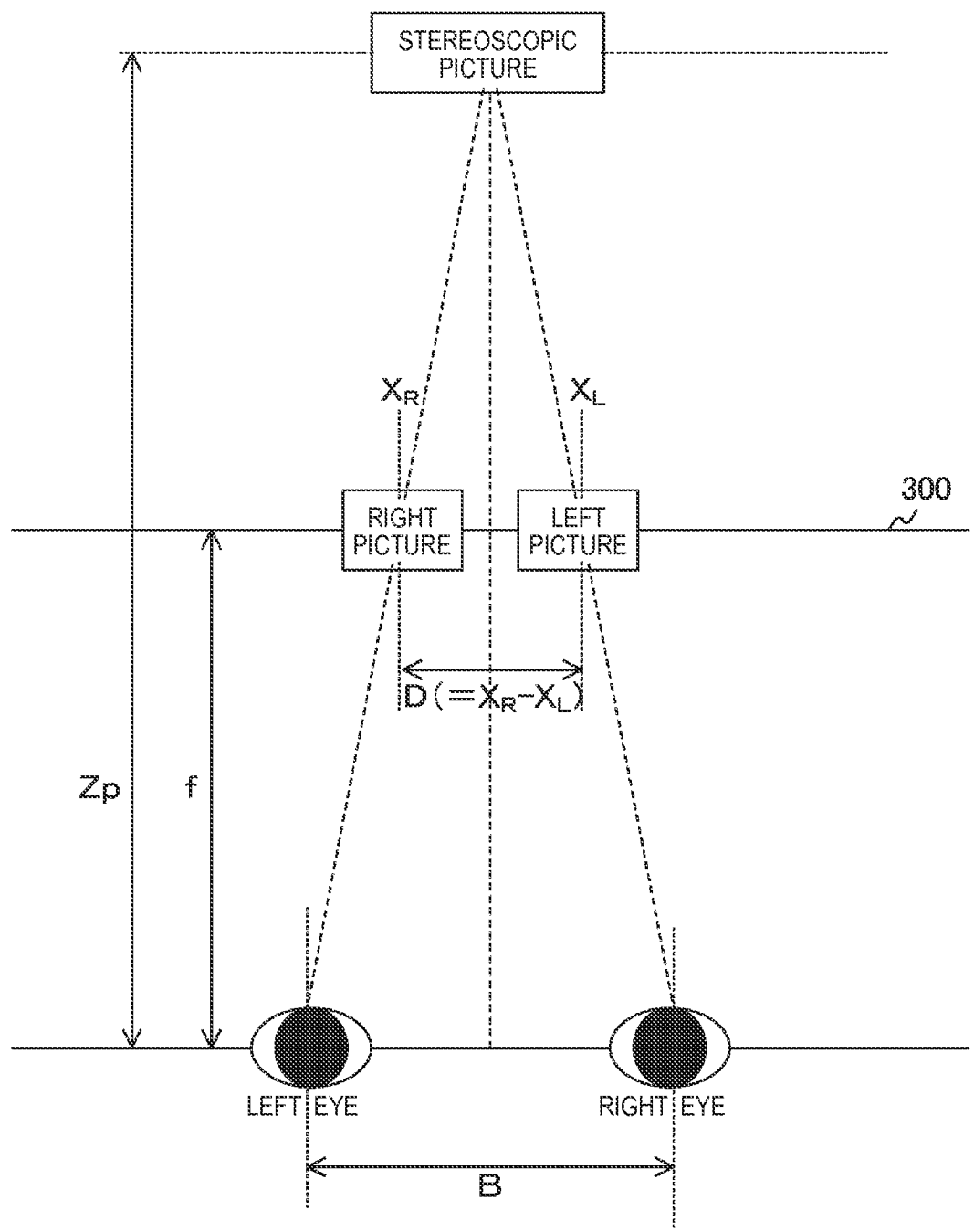
FIG. 12 is a diagram for describing a parallax according to the first embodiment.

FIG. 12 is a diagram for describing a parallax according to an embodiment. A reference horizontal coordinate (for example, a horizontal coordinate of the center) of a right picture to be displayed on a display plane of the display device 300 is assumed to be $X_R$, and a reference horizontal coordinate of a left picture is assumed to be $X_L$. A value of a horizontal coordinate decreases as it is closer to the left when viewed by the viewer. In this case, for example, a value obtained by subtracting $X_L$ from $X_R$ is used as a parallax D.

Here, a distance between the left eye and the right eye is assumed to be a base distance B, a distance from the viewer to the display device 300 is assumed to be f, and a display position of a stereoscopic picture to be stereoscopically viewed in the depth direction is assumed to be Zp. At this time, since a triangle formed by the right eye, the left eye, and the center of the stereoscopic picture is similar to a triangle formed by $X_R$, $X_L$, and the center of the stereoscopic picture, the following Formula 4 holds.

$$D:f = B:Zp \qquad \text{Formula 4}$$

Through Formula 4, the parallax D for performing display at Zp is obtained, and delivered through the subtitle stream. At the position at which display is performed at Zp, when a sense of perspective of a subtitle picture is insufficient, the edge intensity of the subtitle picture is changed based on the gain G obtained by in Formula 1. A degree of a sense of perspective based on the gain G is adjusted by changing the correction coefficient α in Formula 1.

FIG. 13 is a diagram illustrating an exemplary stereoscopic display method according to an embodiment. a in the same figure is a diagram illustrating an exemplary display method of displaying a picture at the front side. In the horizontal direction, coordinates of a right subtitle picture 701 are assumed to be at the left when viewed by the viewer, and coordinates of a left subtitle picture 702 are assumed to be at the right when viewed by the viewer. In this case, when the display device 300 displays the pictures so that the left subtitle picture 702 is viewed by the viewer's left eye, and the right subtitle picture 701 is viewed by the right eye, the viewer can view a subtitle picture 801 being displayed at the front side.

b in the same figure is a diagram illustrating an exemplary display method of displaying a subtitle picture at a reference position. The horizontal coordinates of the right subtitle image 701 and the left subtitle picture 702 are assumed not to change. In this case, when the display device 300 displays the pictures so that the left subtitle picture 702 is viewed by the viewer's left eye, and the right subtitle picture 701 is viewed by the right eye, the viewer can view the subtitle picture 801 being displayed on the display plane (the reference position) of the display device 300. At this time, the subtitle picture 801 is not stereoscopically viewed.

c in FIG. 13 is a diagram illustrating an exemplary display method of displaying a subtitle picture at the back side. In the horizontal direction, coordinates of a right subtitle picture 701 are assumed to be at the right when viewed by the viewer, and coordinates of a left subtitle picture 702 are assumed to be at the left when viewed by the viewer. In this case, when the display device 300 displays the pictures so that the left subtitle picture 702 is viewed by the viewer's left eye, and the right subtitle picture 701 is viewed by the right eye, the viewer can view the subtitle picture 801 being stereoscopically displayed at the back side.

FIG. 14 is a diagram illustrating an exemplary stereoscopic subtitle picture in which a sense of perspective is emphasized according to an embodiment. a in FIG. 14 is a diagram illustrating an exemplary stereoscopic subtitle picture displayed at the front side. In this case, the image processing apparatus 200 increases the edge intensity according to the parallax in the stereoscopic subtitle pictures (701 and 702). As a result, as the display position of the subtitle picture 801 viewed by the viewer approaches the front side, the edge in the subtitle picture 801 is emphasized.

b in FIG. 11 is a diagram illustrating an exemplary stereoscopic subtitle picture in which a subtitle picture is displayed at the back side. In this case, the image processing apparatus 200 reduces the edge intensity according to the parallax in the stereoscopic subtitle pictures (701 and 702). As a result, as the display position of the subtitle picture 801 viewed by the viewer approaches the back side, the edge in the subtitle picture 801 is blurred.

As described above, according to the first embodiment of the present technology, the image processing apparatus 200 can emphasize a sense of perspective of a subtitle picture by changing the edge intensity of the stereoscopic subtitle picture according to the parallax. Accordingly, when a subtitle picture converted from 2D to 3D is combined with a moving picture to be stereoscopically displayed, the viewer does not feel an insufficient sense of perspective of a subtitle picture.

Modified Example

Figure 15:
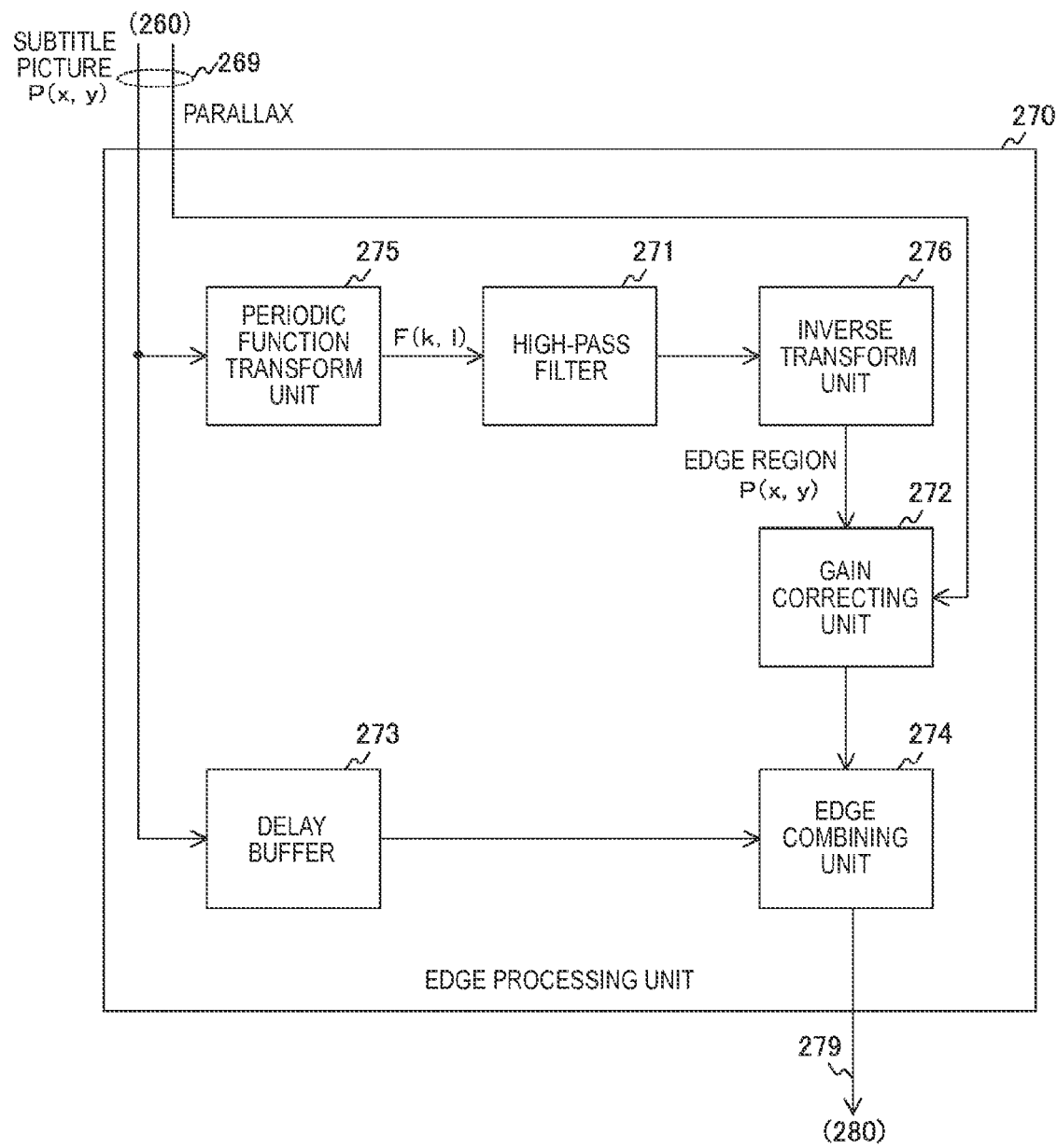
FIG. 15 is a block diagram illustrating an exemplary configuration of an edge processing unit according to a modified example of the first embodiment.

A modified example of the first embodiment will be described with reference to FIG. 15. In the image processing apparatus 200 according to the first embodiment, the stereoscopic subtitle picture is supplied to the high-pass filter 271 without change, but the stereoscopic subtitle picture may be transformed into a periodic function and then supplied to the high-pass filter 271. The image processing apparatus 200 according to the modified example differs from that of the first embodiment in that a stereoscopic subtitle picture is transformed into a note function at a stage before the high-pass filter 271. Specifically, the edge processing unit 270 further includes a periodic function transform unit 275 and an inverse transform unit 276.

The periodic function transform unit 275 transforms a function of coordinate space into a function (periodic function) of frequency space for a stereoscopic subtitle picture. Specifically, the periodic function transform unit 275 transforms a stereoscopic subtitle picture into a periodic function, for example, using the following Formula 5. The transform according to Formula 3 is known as a Fourier transform. The periodic function transform unit 275 may use a formula other than Formula 5 as long as the formula can perform a transform into a periodic function.

[Math 1]

$$F(k, l) = \sum_{x=0}^{M-1} \sum_{y=0}^{N-1} P(x, y) W_M^{xk} W_N^{yl}$$
Formula 5

In Formula 5, x indicates a horizontal coordinate of a stereoscopic subtitle picture, and y indicates a vertical coordinate thereof. P(x,y) is a function of coordinate space that receives coordinates (x,y) and outputs a pixel value at the coordinates (x,y). k indicates a spatial frequency in the horizontal direction, and l indicates a spatial frequency in the vertical direction. F(k,l) is a function that receives a spatial frequency (k,l) and outputs a periodic function indicating a set of component waves having the spatial frequency. The component wave is a wave having a trajectory of a pixel value that periodically changes according to a change in coordinates in a picture as a waveform. M indicates the number M of pixels of a stereoscopic subtitle picture in the horizontal direction, and N indicates the number of pixels of a stereoscopic subtitle picture in the vertical direction. $W_N$ and $W_N$ indicate exponential functions defined by the following Formulas 6 and 7.

[Math 2]

$$W_M = e^{\wedge}\left(-j\frac{2\pi}{M}\right)$$
Formula 6

[Math 3]

$$W_N = e^{\wedge}\left(-j\frac{2\pi}{N}\right)$$
Formula 7

The periodic function transform unit 275 supplies a set of component waves indicated by a transformed periodic function to the high-pass filter 271. The high-pass filter 271 extracts a component wave having a frequency greater than or equal to a certain threshold value among the component waves as an edge component wave. The high-pass filter 271 supplies the extracted edge component wave to the inverse transform unit 276. The inverse transform unit 276 transforms the edge component wave into a set of pixel values P(x,y) using the following Formula 8. The inverse transform unit 276 uses a region including pixels (x,y) from which the pixel values P(x,y) are obtained as an edge region.

[Math 4]

$$P(x, y) = \frac{1}{MN} \sum_{k=0}^{M-1} \sum_{l=0}^{N-1} F(k, l) W_M^{-xk} W_N^{-yl}$$
Formula 8

Figure 16:
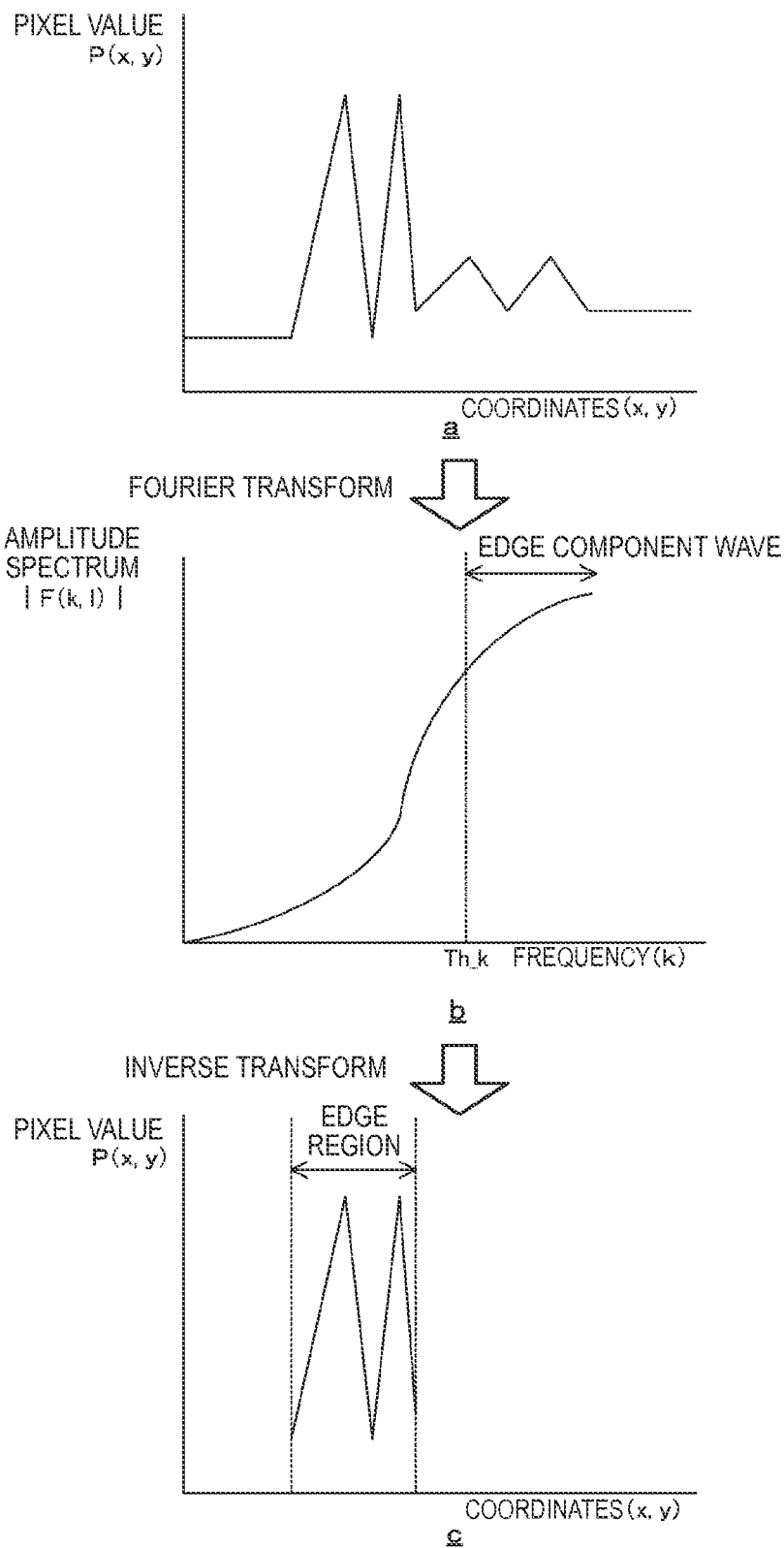
FIG. 16 is a diagram for describing an edge region extraction method according to the modified example of the first embodiment.

FIG. 16 is a diagram for describing an edge region extraction method according to the modified example of the first embodiment. a in FIG. 16 is a diagram illustrating an exemplary pixel value distribution. In a in FIG. 16, a vertical axis indicates a pixel value P(x,y), and a horizontal axis indicates coordinates (x,y). x indicates a horizontal coordinate, and y indicates a vertical coordinate. The pixel value P(x,y) is a pixel value at coordinates (x,y).

b in FIG. 16 is a diagram illustrating an exemplary frequency distribution when a Fourier transform is performed on the pixel values P(x,y). In b in FIG. 16, a vertical axis is an amplitude spectrum |F(k,l)|, and a horizontal axis is a spatial frequency k. In b in FIG. 16, the distribution of the spatial frequency 1 is not illustrated. As illustrated in b in FIG. 16, the high-pass filter 271 extracts a component wave greater than or equal to a threshold value Th_k as an edge component wave.

c in FIG. 16 is a diagram illustrating an exemplary distribution of the pixel values P(x,y) when an inverse transform is performed on the extracted edge component waves. As illustrated in c in FIG. 16, a region including pixels (x,y) having the transformed pixel values P(x,y) is extracted as an edge region.

As described above, according to the modified example, the image processing apparatus 200 extracts an edge component wave after generating a periodic function distribution and thus can accurately extract an edge region.

2. First Embodiment

Exemplary Configuration of Image Processing Apparatus

Figure 17:
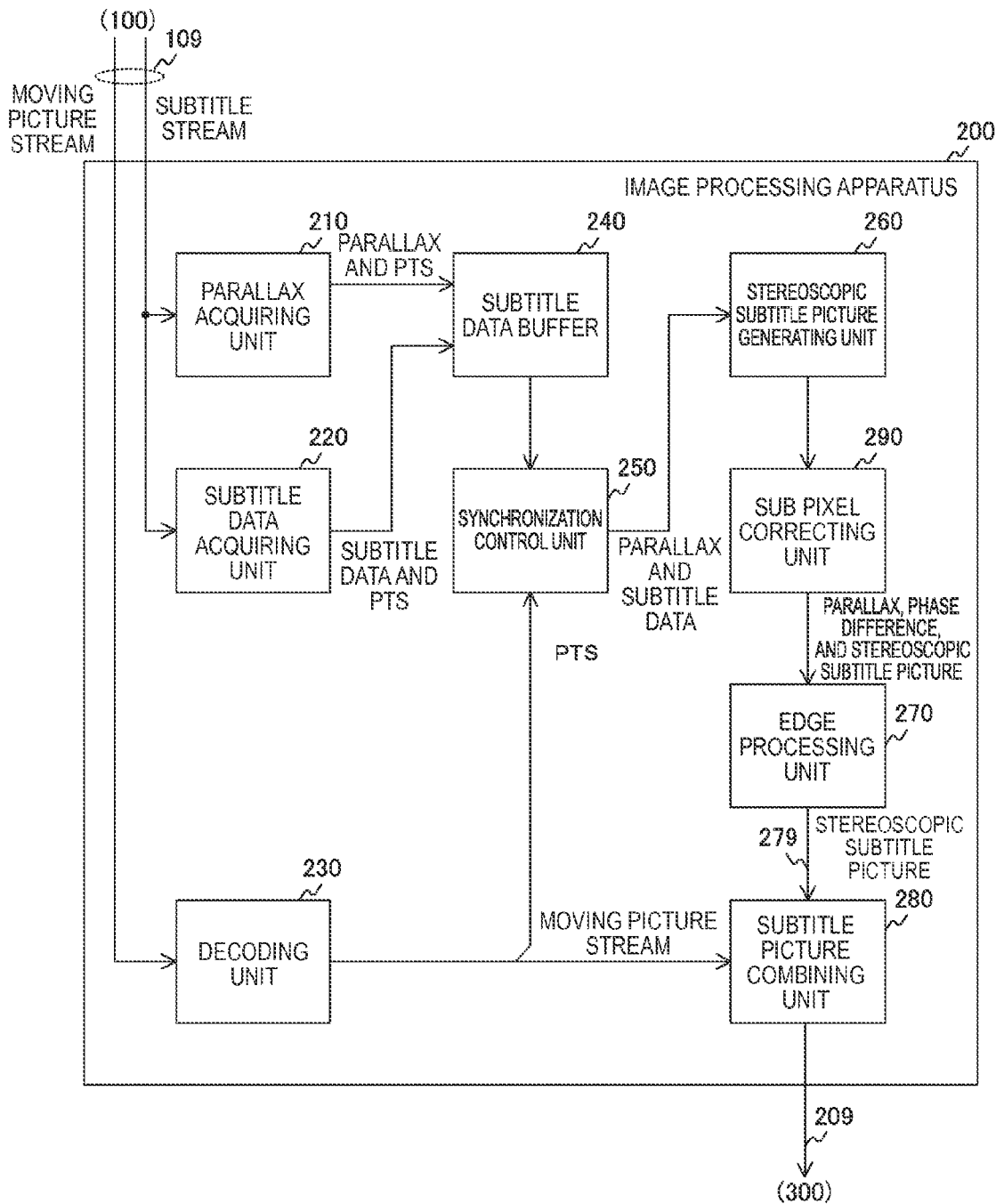
FIG. 17 is a block diagram illustrating an exemplary configuration of an image processing apparatus according to the second embodiment.

FIG. 17 is a block diagram illustrating an exemplary configuration of an image processing apparatus 200 according to a second embodiment. The image processing apparatus 200 according to the second embodiment differs from that of the first embodiment in that sub pixel correction is further performed. Specifically, the image processing apparatus 200 according to the first embodiment further includes a sub pixel correcting unit 290. Here, the sub pixel correction refers to a process of mixing pixel values of neighboring pixels in a picture to cause the viewer to visually perceive a dummy pixel (hereinafter referred to as a "sub pixel") between actual pixels on a display plane. Hereinafter, a picture that has been subjected to sub pixel correction is referred to as a "sub pixel picture." A sub pixel is an example of a sub pixel set forth in the appended claims.

In the first embodiment, when a depth of a subtitle picture is changed little by little according to a lapse of time, the image processing apparatus 200 shifts the horizontal coordinates of the left subtitle picture and the right subtitle picture in units of pixels. However, in order to change the depth more smoothly, it is desirable to shift the left subtitle picture and the right subtitle picture in units of sub pixels rather than in units of pixels. In this regard, the image processing apparatus 200 of the second embodiment replaces some stereoscopic subtitle pictures with sub pixel pictures and shifts a stereoscopic subtitle picture in units of sub pixels. Here, since neighboring pixels are mixed in the sub pixel correction as described above, the edge intensity decreases. Thus, when the sub pixel correction is performed, it is preferable that the image processing apparatus 200 increase the edge intensity by a decrease in the edge intensity caused by the sub pixel correction.

The sub pixel correcting unit 290 performs the sub pixel correction on the stereoscopic subtitle picture based on a parallax. Under the assumption that one stereoscopic subtitle picture is a frame, a change in a parallax in which a pixel shift amount of a stereoscopic subtitle picture corresponds to one pixel is considered to be performed within a period of time of n frames. In this case, the sub pixel correcting unit 290 performs the sub pixel correction on (n−2) frames excluding chronologically first and last frames among the n frames to generate a sub pixel picture. For example, when a change in a parallax in which the shift amount corresponds to one pixel is performed within a period of time of 3 frames, the sub pixel correcting unit 290 performs the sub pixel correction on one frame excluding first and last frames among the 3 frames.

Here, a difference between a horizontal coordinate of a pixel close to a sub pixel in left and right pixels neighboring the sub pixel in the horizontal direction and a horizontal coordinate of the sub pixel is referred to as a "phase difference." Since a sub pixel is positioned between pixels, the phase difference has a value from "−0.5" to "0.5." Here, a phase difference of "0" indicates that the sub pixel correction is not performed.

The phase difference is decided according to a parallax. Specifically, when a change in a parallax in which the shift amount corresponds to one pixel is performed within a period of time of n frames, phase differences of chronologically first and last frames among n frames are set to "0." When the shift direction is a positive direction, a phase difference P of a chronologically k-th (k is an integer from 1 to n) frame that increases as k approaches n/2 from 1 and decreases as k approaches n from n/2 is decided. Meanwhile, when the shift direction is a negative direction, the phase difference P that decreases as k approaches n/2 from 1 and increases as k approaches n from n/2 is decided.

For example, when a change in a parallax in which the shift amount in the positive direction corresponds to one pixel is performed within a period of time of 3 frames, phase differences of first and third frames are decided to be "0," and a phase difference of a second frame is decided to be "0.5." The sub pixel correcting unit 290 supplies the stereoscopic subtitle picture that has been subjected to the sub pixel correction, the phase difference P, and the parallax D to the edge processing unit 270.

When the phase difference P is "0," the edge processing unit 270 obtains a gain using Formula 1. However, when the phase difference P is not "0," the gain is obtained using the following Formula 9 instead of Formula 1.

$$G=|P|\times(-\alpha)\times D/Dm \quad \text{Formula 9}$$

When Formula 9 is used, a gain increases according to an absolute value of a phase difference. Thus, the edge is emphasized by a decrease in the edge intensity caused by the sub pixel correction. In Formula 9, D indicates a parallax of a pixel unit, but D may indicate a parallax of a sub pixel unit.

FIG. 18 is a diagram illustrating exemplary sub pixel correction according to the second embodiment. a in FIG. 18 is a diagram illustrating exemplary sub pixel correction when a phase difference is decided to be "0.5." In the left subtitle picture, pixel values of pixels at horizontal coordinates $X_1$, $X_1+1$, and $X_1+2$ are assumed to be $P_{X1}$, $P_{X1+1}$, and $P_{X1+2}$. When the sub pixel correction is performed, pixel values of neighboring pixels are mixed at a mixing rate according to a phase difference. Specifically, when the phase difference P is a positive number, a pixel value $P_{X1}'$ at the horizontal coordinate $X_1$ after the sub pixel correction is calculated by the following Formula 10.

$$P_{X1}'=P\times P_{X1}+(1-P)\times P_{X1+1} \quad \text{Formula 10}$$

For example, when the phase difference P is 0.5, the pixel value $P_{X1}'$ is an average value of the pixel values $P_{X1}$ and $P_{X1+1}$. Through a similar calculation, the pixel values $P_{X1+1}$ and $P_{X1+2}$ are replaced through averaging of neighboring pixels.

b in FIG. 18 is a diagram for describing a sub pixel correction method according to the second embodiment. As illustrated in b in FIG. 18, the image processing apparatus 200 can mix neighboring pixels and thus cause a sub pixel to appear between actual pixels in the sub pixel picture (the left subtitle picture).

FIG. 19 is a diagram illustrating exemplary left subtitle pictures and right subtitle pictures before and after the sub pixel correction according to the second embodiment. a in FIG. 19 is a diagram illustrating exemplary left subtitle pictures and right subtitle pictures when a change in a parallax in which the shift amount corresponds to one pixel is performed within a period of time of 3 frames without sub pixel correction. When left subtitle pictures #1, #2, and #3 are chronologically displayed, for example, the image processing apparatus 200 changes a parallax by causing left-end coordinates of the left subtitle pictures #1 and #2 to be identical and the next left subtitle picture #3 to deviate by one pixel. In order to decrease a parallax, the left subtitle picture #3 is shifted rightward when viewed by the viewer. Meanwhile, when right subtitle pictures #1, #2, and #3 are chronologically displayed, the image processing apparatus 200 changes a parallax by causing only the right subtitle picture #3 to deviate by one pixel. The left subtitle picture #2 and the right subtitle picture #2 are not illustrated in a in FIG. 19.

b in FIG. 19 is a diagram illustrating exemplary left subtitle pictures and right subtitle pictures when a change in a parallax in which the shift amount corresponds to one pixel is performed within a period of time of 3 frames through sub pixel correction. The image processing apparatus 200 replaces the left subtitle picture #2 among the left subtitle pictures #1, #2, and #3 with the sub pixel picture, and replaces the right subtitle picture #2 among the right subtitle pictures #1, #2, and #3 with the sub pixel picture. Thus, the left subtitle picture and the right subtitle picture are shifted in units of sub pixels, and the depth is changed more smoothly than when the shift is performed in units of pixels.

Figure 20:
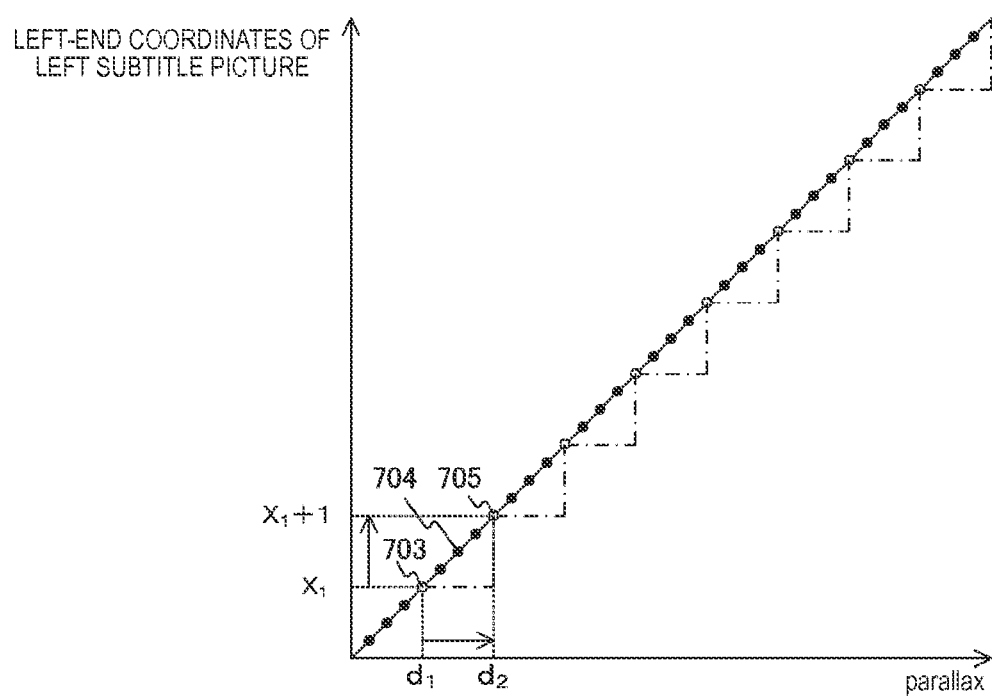
FIG. 20 is a graph illustrating an exemplary relation between a change in a parallax and a change in coordinates of a subtitle picture according to the second embodiment.

FIG. 20 is a graph illustrating an exemplary relation between a change in a parallax and a change in coordinates of a subtitle picture according to the second embodiment. In FIG. 20, a vertical axis indicates a left-end horizontal coordinate in a left subtitle picture, and a horizontal axis indicates a parallax. An alternate long and short dash line indicates a change in coordinates of a subtitle picture according to a change in a parallax when the sub pixel correction is not performed. A solid line indicates a change in coordinates of a subtitle picture according to a change in a parallax when the sub pixel correction is performed. As illustrated in FIG. 20, when the sub pixel correction is not performed, the left subtitle picture is shifted in units of pixels according to a change in a parallax. The right subtitle picture is also shifted in units of pixels. However, when the sub pixel correction is performed, the left subtitle picture is shifted in units of sub pixels according to a change in a parallax. The right subtitle picture is also shifted in units of sub pixels. Thus, compared to when the left subtitle picture and the right subtitle picture are shifted in units of pixels, the depth of the stereoscopic subtitle picture is changed smoothly.

As described above, according to the second embodiment of the present technology, the image processing apparatus 200 changes the edge intensity according to a mixing rate and a parallax in the sub pixel correction and thus can emphasize a sense of perspective of a subtitle picture while changing the depth smoothly.

The above embodiments are examples for implementing the present technology, and matters in the embodiments have a correspondence relation with invention-specifying matters in the appended claims. Similarly, invention-specifying matters in the appended claims have a correspondence relation with matters having the same name in the embodiments of the present technology. Here, the present technology is not limited to the above embodiments, and can be implemented by variously modifying the above embodiments within the scope not departing from the gist thereof.

Further, the processing processes described in the above embodiments may be understood as a method having a series of processes, and may be understood as a program causing a computer to execute the series of processes or a recording medium storing the program. As the recording medium, for example, a Compact Disc (CD), a MiniDisc (MD), a Digital Versatile Disc (DVD), a memory card, a Blu-ray (a registered trademark) disc, or the like may be used.

Additionally, the present technology may also be configured as below.

(1) An image processing apparatus including:
a subtitle information acquiring unit configured to acquire subtitle information to be combined with a main stereoscopic picture;
a parallax acquiring unit configured to acquire a parallax causing the subtitle information to be stereoscopically displayed;
a stereoscopic subtitle picture generating unit configured to generate a stereoscopic subtitle picture to be stereoscopically displayed at a display position according to the parallax based on the subtitle information; and
an edge processing unit configured to change intensity of an edge in the stereoscopic subtitle picture according to the parallax.

(2) The image processing apparatus according to (1),
wherein the edge processing unit increases the intensity of the edge according to the parallax when the display position is in front of a certain reference position, and decreases the intensity of the edge according to the parallax when the display position is behind the reference position.

(3) The image processing apparatus according to (1) or (2), further including:
a pixel mixing unit configured to mix pixel values of neighboring pixels based on a mixing rate according to a position of a sub pixel to be displayed between the neighboring pixels in the stereoscopic subtitle picture,
wherein the edge processing unit changes the intensity of the edge according to the position and the parallax.

(4) The image processing apparatus according to (3),
wherein the pixel mixing unit uses a position according to the parallax as the position of the sub pixel.

(5) The image processing apparatus according to any one of (1) to (4),
wherein the edge processing unit includes
an edge extracting unit configured to extract a region of the edge in the stereoscopic subtitle picture,
a correcting unit configured to increase or decrease a pixel value in the extracted region of the edge according to the parallax, and
an edge combining unit configured to combine the region of the edge having the increased or decreased pixel value with the stereoscopic subtitle picture and change the intensity of the edge.

(6) The image processing apparatus according to (5),
wherein the edge extracting unit extracts a region in which a frequency of a pixel value distribution in the stereoscopic subtitle picture is higher than a certain threshold value as the region of the edge.

(7) The image processing apparatus according to any one of (1) to (6), further including:
a subtitle combining unit configured to combine the stereoscopic subtitle picture having the changed intensity of the edge with the main stereoscopic picture.

(8) An image processing method including:
a subtitle information acquiring process of acquiring, by a subtitle information acquiring unit, subtitle information to be combined with a main stereoscopic picture;
a parallax acquiring process of acquiring, by a parallax acquiring unit, a parallax causing the subtitle information to be stereoscopically displayed;
a stereoscopic subtitle picture generating process of generating, by a stereoscopic subtitle picture generating unit, a stereoscopic subtitle picture to be stereoscopically displayed at a display position according to the parallax based on the subtitle information; and
an edge processing process of changing, by an edge processing unit, intensity of an edge in the stereoscopic subtitle picture according to the parallax.

(9) A program causing a computer to execute:
a subtitle information acquiring process of acquiring, by a subtitle information acquiring unit, subtitle information to be combined with a main stereoscopic picture;
a parallax acquiring process of acquiring, by a parallax acquiring unit, a parallax causing the subtitle information to be stereoscopically displayed;
a stereoscopic subtitle picture generating process of generating, by a stereoscopic subtitle picture generating unit, a stereoscopic subtitle picture to be stereoscopically displayed at a display position according to the parallax based on the subtitle information; and
an edge processing process of changing, by an edge processing unit, intensity of an edge in the stereoscopic subtitle picture according to the parallax.

REFERENCE SIGNS LIST 100 receiving device
200 image processing apparatus 210 parallax acquiring unit
220 subtitle data acquiring unit
230 decoding unit
240 subtitle data buffer
250 synchronization control unit
260 stereoscopic subtitle picture generating unit
270 edge processing unit
271 high-pass filter
272 gain correcting unit
273 delay buffer
274 edge combining unit
275 periodic function transform unit
276 inverse transform unit
280 subtitle picture combining unit
290 sub pixel correcting unit
300 display device

The invention claimed is:

1. An image processing apparatus comprising a computer programmed to invoke:
   a subtitle information acquiring unit configured to acquire subtitle information to be combined with a main stereoscopic picture;
   a parallax acquiring unit configured to acquire a parallax causing the subtitle information to be stereoscopically displayed;
   a stereoscopic subtitle picture generating unit configured to generate a stereoscopic subtitle picture to be stereoscopically displayed at a display position according to the parallax based on the subtitle information; and
   an edge processing unit configured to change intensity of an edge in the stereoscopic subtitle picture according to the parallax,
   wherein,
      the edge processing unit increases the intensity of the edge according to the parallax when the display position is in front of a certain reference position, and decreases the intensity of the edge according to the parallax when the display position is behind the reference position.

2. The image processing apparatus according to claim 1, wherein:
   the computer is programmed to invoke a pixel mixing unit configured to mix pixel values of neighboring pixels based on a mixing rate according to a position of a sub pixel to be displayed between the neighboring pixels in the stereoscopic subtitle picture, and
   the edge processing unit changes the intensity of the edge according to the position and the parallax.

3. The image processing apparatus according to claim 2, wherein the pixel mixing unit uses a position according to the parallax as the position of the sub pixel.

4. The image processing apparatus according to claim 1, wherein the edge processing unit includes
   an edge extracting unit configured to extract a region of the edge in the stereoscopic subtitle picture,
   a correcting unit configured to increase or decrease a pixel value in the extracted region of the edge according to the parallax, and
   an edge combining unit configured to combine the region of the edge having the increased or decreased pixel value with the stereoscopic subtitle picture and change the intensity of the edge.

5. The image processing apparatus according to claim 4, wherein the edge extracting unit extracts a region in which a frequency of a pixel value distribution in the stereoscopic subtitle picture is higher than a certain threshold value as the region of the edge.

6. The image processing apparatus according to claim 1, wherein the computer is programmed to invoke a subtitle combining unit configured to combine the stereoscopic subtitle picture having the changed intensity of the edge with the main stereoscopic picture.

7. An image processing method invoked by a computer, the method comprising:
   a subtitle information acquiring process of acquiring, by a subtitle information acquiring unit, subtitle information to be combined with a main stereoscopic picture;
   a parallax acquiring process of acquiring, by a parallax acquiring unit, a parallax causing the subtitle information to be stereoscopically displayed;
   a stereoscopic subtitle picture generating process of generating, by a stereoscopic subtitle picture generating unit, a stereoscopic subtitle picture to be stereoscopically displayed at a display position according to the parallax based on the subtitle information; and
   an edge processing process of changing, by an edge processing unit, intensity of an edge in the stereoscopic subtitle picture according to the parallax, by increasing the intensity of the edge according to the parallax when the display position is in front of a certain reference position, and decreasing the intensity of the edge according to the parallax when the display position is behind the reference position.

8. A non-transitory computer readable storage medium with computer program instructions stored thereon, which computer program instructions when executed cause a computer to execute:
   a subtitle information acquiring process of acquiring, by a subtitle information acquiring unit, subtitle information to be combined with a main stereoscopic picture;
   a parallax acquiring process of acquiring, by a parallax acquiring unit, a parallax causing the subtitle information to be stereoscopically displayed;
   a stereoscopic subtitle picture generating process of generating, by a stereoscopic subtitle picture generating unit, a stereoscopic subtitle picture to be stereoscopically displayed at a display position according to the parallax based on the subtitle information; and
   an edge processing process of changing, by an edge processing unit, intensity of an edge in the stereoscopic subtitle picture according to the parallax, by increasing the intensity of the edge according to the parallax when the display position is in front of a certain reference position, and decreasing the intensity of the edge according to the parallax when the display position is behind the reference position.

* * * * *